(12) United States Patent
Gozdz et al.

(10) Patent No.: US 8,617,745 B2
(45) Date of Patent: Dec. 31, 2013

(54) LITHIUM SECONDARY CELL WITH HIGH CHARGE AND DISCHARGE RATE CAPABILITY AND LOW IMPEDANCE GROWTH

(75) Inventors: Antoni S. Gozdz, Marlborough, MA (US); Andrew C. Chu, Cambridge, MA (US); Ricardo Fulop, Brookline, MA (US); Yet-Ming Chiang, Framingham, MA (US); Gilbert N. Riley, Jr., Marlborough, MA (US); Roger Lin, Northboro, MA (US)

(73) Assignee: A123 Systems LLC, Livonia, MI (US)

( * ) Notice: Subject to any disclaimer, the term of this patent is extended or adjusted under 35 U.S.C. 154(b) by 1575 days.

(21) Appl. No.: 11/518,974

(22) Filed: Sep. 11, 2006

(65) Prior Publication Data
US 2007/0166617 A1  Jul. 19, 2007

Related U.S. Application Data

(63) Continuation-in-part of application No. 11/052,971, filed on Feb. 7, 2005, now Pat. No. 7,348,101.

(60) Provisional application No. 60/715,543, filed on Sep. 9, 2005, provisional application No. 60/542,550, filed on Feb. 6, 2004.

(51) Int. Cl.
*H01M 4/133* (2010.01)
*H01M 4/136* (2010.01)

(52) U.S. Cl.
USPC ..................................... 429/231.9; 429/231.5

(58) Field of Classification Search
USPC .............. 429/231.95, 231.1, 231.5, 225, 221, 429/223, 224, 231.6, 231.8
See application file for complete search history.

(56) References Cited

U.S. PATENT DOCUMENTS

| | | | |
|---|---|---|---|
| 4,302,518 A | 11/1981 | Goodenough et al. |
| 4,305,847 A | 12/1981 | Stoetzer et al. |
| 4,382,981 A | 5/1983 | Stoetzer et al. |
| 4,423,125 A | 12/1983 | Basu |
| 4,615,959 A | 10/1986 | Hayashi et al. |
| 4,806,272 A | 2/1989 | Wiley |

(Continued)

FOREIGN PATENT DOCUMENTS

| | | |
|---|---|---|
| JP | 2003331840 A | 11/2003 |
| JP | 2004273448 | 9/2004 |

(Continued)

OTHER PUBLICATIONS

Abraham, K. M. et al., "Discharge Rate Capability of the $LiCoO_2$ Electrode," J. Electrochem. Soc., vol. 145, No. 2, Feb. 1998. (pp. 482-486).

(Continued)

*Primary Examiner* — Mark F Huff
*Assistant Examiner* — Monique Wills
(74) *Attorney, Agent, or Firm* — Wilmer Cutler Pickering Hale and Dorr LLP

(57) ABSTRACT

A lithium-ion battery is provided that has a fast charge and discharge rate capability and low rate of capacity fade during high rate cycling. The battery can exhibit low impedance growth and other properties allowing for its use in hybrid electric vehicle applications and other applications where high power and long battery life are important features.

17 Claims, 23 Drawing Sheets

(56) References Cited

U.S. PATENT DOCUMENTS

| | | | |
|---|---|---|---|
| 4,957,833 A | 9/1990 | Daifuku et al. |
| 5,389,403 A | 2/1995 | Buckley et al. |
| 5,538,814 A | 7/1996 | Kamauchi et al. |
| 5,612,155 A | 3/1997 | Takami et al. |
| 5,705,296 A | 1/1998 | Kamauchi et al. |
| 5,795,678 A | 8/1998 | Takami et al. |
| 5,856,737 A | 1/1999 | Miller et al. |
| 5,948,569 A | 9/1999 | Moses et al. |
| 6,022,640 A | 2/2000 | Takada et al. |
| 6,136,472 A | 10/2000 | Barker et al. |
| 6,146,791 A | 11/2000 | Loutfy et al. |
| 6,153,333 A | 11/2000 | Barker |
| 6,165,646 A | 12/2000 | Takada et al. |
| 6,200,704 B1 | 3/2001 | Katz et al. |
| 6,221,531 B1 | 4/2001 | Vaughey et al. |
| 6,242,132 B1 | 6/2001 | Neudecker et al. |
| 6,248,477 B1 | 6/2001 | Howard, Jr. et al. |
| 6,255,017 B1 | 7/2001 | Turner |
| 6,277,522 B1 | 8/2001 | Omaru et al. |
| 6,294,292 B1 | 9/2001 | Tsushima et al. |
| 6,333,621 B2 | 12/2001 | Yamashita et al. |
| 6,337,156 B1 | 1/2002 | Narang et al. |
| 6,346,343 B1 | 2/2002 | Notten et al. |
| 6,391,488 B1 | 5/2002 | Shimizu et al. |
| 6,391,493 B1 | 5/2002 | Goodenough et al. |
| 6,391,494 B2 | 5/2002 | Reitz et al. |
| 6,428,933 B1 | 8/2002 | Christensen et al. |
| 6,447,946 B1 | 9/2002 | Nakai et al. |
| 6,447,951 B1 | 9/2002 | Barker et al. |
| 6,455,198 B1 | 9/2002 | Kitoh |
| 6,479,186 B1 | 11/2002 | Nemoto et al. |
| 6,482,548 B2 | 11/2002 | Amatucci |
| 6,503,646 B1 | 1/2003 | Ghantous et al. |
| 6,511,773 B1 | 1/2003 | Dampier |
| 6,514,640 B1 | 2/2003 | Armand et al. |
| 6,528,212 B1 | 3/2003 | Kusumoto et al. |
| 6,596,430 B2 | 7/2003 | Nemoto et al. |
| 6,596,439 B1 | 7/2003 | Tsukamoto et al. |
| 6,617,073 B1 | 9/2003 | Matsumoto et al. |
| 6,641,953 B2 | 11/2003 | Takeuchi et al. |
| 6,645,667 B1 | 11/2003 | Iwamoto et al. |
| 6,646,635 B2 | 11/2003 | Pogatetz et al. |
| 6,656,635 B2 | 12/2003 | Okawa et al. |
| 6,682,849 B2 | 1/2004 | Narang et al. |
| 6,716,332 B1 | 4/2004 | Yoshioka et al. |
| 6,730,429 B2 | 5/2004 | Thackeray et al. |
| 6,733,925 B2 | 5/2004 | Hironaka et al. |
| 6,740,446 B2 | 5/2004 | Corrigan et al. |
| 6,753,111 B2 | 6/2004 | Kweon et al. |
| 6,773,838 B2 | 8/2004 | Suzuki et al. |
| 6,794,036 B2 | 9/2004 | Matsumoto et al. |
| 6,800,399 B2 | 10/2004 | Matsumoto |
| 6,803,149 B2 | 10/2004 | Nakai et al. |
| 6,803,746 B2 | 10/2004 | Aker et al. |
| 6,811,919 B2 | 11/2004 | Nemoto |
| 6,814,764 B2 | 11/2004 | Hosoya et al. |
| 6,815,122 B2 | 11/2004 | Barker et al. |
| 6,830,848 B1 | 12/2004 | Fujiwara et al. |
| 6,832,171 B2 | 12/2004 | Barsoukov et al. |
| 6,852,446 B2 | 2/2005 | Barbarich |
| 6,858,345 B2 | 2/2005 | Amine et al. |
| 6,858,348 B2 | 2/2005 | Kitoh |
| 6,878,487 B2 | 4/2005 | Cho et al. |
| 6,878,490 B2 | 4/2005 | Gao et al. |
| 6,884,544 B2 | 4/2005 | Barker et al. |
| 6,884,546 B1 | 4/2005 | Fujita et al. |
| 6,890,686 B1 | 5/2005 | Barker et al. |
| 6,908,711 B2 | 6/2005 | Fauteux et al. |
| 7,045,252 B2 | 5/2006 | Christian et al. |
| 7,348,101 B2 | 3/2008 | Gozdz et al. |
| 7,510,803 B2 | 3/2009 | Adachi et al. |
| 8,178,239 B2 | 5/2012 | Hatta et al. |
| 2001/0033972 A1 | 10/2001 | Kawai et al. |
| 2001/0053484 A1 | 12/2001 | Takeuchi et al. |
| 2002/0028380 A1 | 3/2002 | Tanjo et al. |
| 2002/0074972 A1 | 6/2002 | Narang et al. |
| 2002/0081485 A1 | 6/2002 | Takekawa et al. |
| 2002/0086214 A1 | 7/2002 | Barker et al. |
| 2002/0102459 A1 | 8/2002 | Hosoya et al. |
| 2002/0106563 A1 | 8/2002 | Okawa et al. |
| 2002/0110736 A1 | 8/2002 | Kweon et al. |
| 2002/0122983 A1 | 9/2002 | Nakai et al. |
| 2002/0182497 A1 | 12/2002 | Kohzaki et al. |
| 2003/0118904 A1 | 6/2003 | Hosokawa et al. |
| 2003/0129492 A1 | 7/2003 | Barker et al. |
| 2003/0129496 A1 | 7/2003 | Kasai et al. |
| 2003/0180617 A1 | 9/2003 | Fujimoto et al. |
| 2003/0194601 A1 | 10/2003 | Lei |
| 2003/0194605 A1 | 10/2003 | Fauteux et al. |
| 2004/0005265 A1 | 1/2004 | Chiang et al. |
| 2004/0023118 A1 | 2/2004 | Kinoshita et al. |
| 2004/0053134 A1 | 3/2004 | Ozaki et al. |
| 2004/0058244 A1 | 3/2004 | Hosoya et al. |
| 2004/0091779 A1 | 5/2004 | Kang et al. |
| 2004/0096740 A1 | 5/2004 | Fukuzawa et al. |
| 2004/0121195 A1 | 6/2004 | Ghantous et al. |
| 2004/0122178 A1 | 6/2004 | Huang et al. |
| 2004/0131934 A1 | 7/2004 | Sugnaux et al. |
| 2004/0151951 A1 | 8/2004 | Hyung et al. |
| 2004/0161660 A1 | 8/2004 | Syracuse et al. |
| 2004/0185343 A1 | 9/2004 | Wang et al. |
| 2004/0234865 A1* | 11/2004 | Sato et al. ............. 429/322 |
| 2004/0258986 A1 | 12/2004 | Shen et al. |
| 2004/0265695 A1 | 12/2004 | Barker et al. |
| 2004/0265696 A1* | 12/2004 | Belharouak et al. ...... 429/231.95 |
| 2005/0003274 A1 | 1/2005 | Armand et al. |
| 2005/0058905 A1 | 3/2005 | Barker et al. |
| 2005/0064282 A1 | 3/2005 | Inagaki et al. |
| 2005/0069758 A1 | 3/2005 | Kitao et al. |
| 2005/0069775 A1 | 3/2005 | Hwang et al. |
| 2005/0142442 A1 | 6/2005 | Yuasa et al. |
| 2006/0035150 A1 | 2/2006 | Audemer et al. |
| 2007/0031732 A1 | 2/2007 | Chiang et al. |

FOREIGN PATENT DOCUMENTS

| | | |
|---|---|---|
| JP | 200532701 | 2/2005 |
| WO | WO-98/12761 A1 | 3/1998 |
| WO | WO-03/019713 A1 | 3/2003 |

OTHER PUBLICATIONS

Auerbach, D. et al., *Factors Which Limit the Cycle Life of Rechargeable Lithium (Metal) Batteries* Journal of Electrochemical Society 147(4) 1274-1279 (2000).

Papike, J. and Cameron, M. "Crystal Chemistry of Silicate Minerals of Geophysical Interest" *Reviews of Geophysics and Space Physics*, vol. 14, No. 1, pp. 37-80 (1976).

Peled, E. "Lithium Stability and Film Formation in Organic and Inorganic Electrolyte for Lithium Battery Systems" in *Lithium Batteries*, J.P. Gabano, Ed. Academic Press, London, 1983, p. 43-72.

Ploehu, H.J. et al. "Solvent Diffusion Model for Aging of Lithium-Ion Battery Cells" *J. Electrochem. Soc'y* 151(3):A456-A462 (2004).

Premanand, R. et al. "Studies on Capacity Fade of Spinel-Based Li-Ion Batteries" Journal of the Electrochemical Society, 149(1) A54-A60 (2002).

Yang et al. "Evaluation of Electrochemical Interface Area and Lithium Diffusion Coefficient for a Composit Graphite Anode" Journal of the Electrochemical Society, vol. 151 (8) pp. A1247-A1250 (2004).

Supplementary Partial European Search Report for European Patent Application No. 0681445.6 mailed Feb. 1, 2010. 1 page.

U.S. Patent and Trademark Office, International Search Report of PCT/US06/35295, mailed Apr. 17, 2007, 3 pages.

"Aerovironment, Altair Nanotechnologies, Go Green Holding and Micro-Vett Announce A Successful, Multiple Fast-Charge Demonstration of an All-Electric Delivery Vehicle in Oslo, Norway" Retrieved from <www.b2i.us/profiles/investor/NewsPrint.asp?b=546&ID=21772&m=rl> on Jun. 11, 2009 (3 pages).

"Toshiba to Launch Innovative Rechargeable Battery Business" Toshiba: Press Release Dec. 11, 2007. Retrieved from <www.toshiba.co.jp/about/press/2007_12/pr1101.htm> on Jun. 11, 2009 (3 pages).

(56) References Cited

OTHER PUBLICATIONS

"Toshiba's New Rechargeable Lithium-Ion Battery Recharges in Only One Minute" Toshiba: Press Release Mar. 29, 2005. Retrieved from <www.toshiba.co.jp/about/press/2005_03/pr2901.htm> on Jun. 11, 2009 (3 pages).

Blanco, Sebastian. "AeroVironment successfully quick charges Altair Nanotechnologies battery" Autoblog Green, May 30, 2007. Retrieved from <www.autobloggreen.com/2007/05/30/aerovironment-successfully-quick-charges-altair-nanotechnologie/> on Jun. 11, 2009 (1 page).

European Exam Report, European Patent Application No. 05722761.3, dated Feb. 23, 2009 (4 pages).

Hara, Yoshiko. "Lithium ion battery recharges in one minute" EETimes.com, Mar. 29, 2005. Retrieved from <www.eetimes.com/showArticle.jhtml?articleID=159907938> on Jun. 11, 2009 (1 page).

Kim, et al., "High Performance Lithium Ion Polymer Battery for Hybrid Electric Vehicle," EVS21 Conference, Monaco, Apr. 2-6, 2005 (8 pages).

Lacout, et al., "High Power Li-ion Technology for Full Hybrid Automotive Application Lion Heart Project," EVS21 Conference, Monaco, Apr. 2-6, 2005 (10 pages).

Song, J.Y. et al. "Two-and Three-electrode Impedance Spectroscopy of Lithium-ion Batteries." Journal of Power Sources. vol. 111. May 22, 2002. 255-267. 13 pages.

\* cited by examiner

LITHIUM SECONDARY CELL WITH HIGH CHARGE AND DISCHARGE RATE CAPABILITY AND LOW IMPEDANCE GROWTH

RELATED APPLICATIONS

This application is a continuation-in-part of U.S. patent application Ser. No. 11/052,971 filed Feb. 7, 2005 entitled "Lithium Secondary Cell With High Charge And Discharge Rate Capability", which claims priority under 35 U.S.C. §119(e) to application Ser. No. 60/542,550 filed Feb. 6, 2004, entitled "Non-Aqueous Electrolyte Secondary Cell with High Charge and Discharge Rate Capability," both of which are incorporated in their entirety by reference.

This application also claims priority under 35 U.S.C. §119(e) to application Ser. No. 60/715,543 filed Sep. 9, 2005, entitled "Lithium Secondary Cell With High Charge And Discharge Rate Capability And Low Impedance Growth," which is incorporated in its entirety by reference.

BACKGROUND

1. Field

The field relates to non-aqueous electrolyte secondary cells, and in particular a battery having a fast charge and discharge rate capability and low rate of capacity fade during such high rate cycling. The battery can exhibit low impedance growth, allowing for its use in hybrid electric vehicle applications and other high demand applications.

2. Description of the Related Art

Contemporary portable electronic appliances rely almost exclusively on rechargeable Li-ion batteries as the source of power. This has spurred a continuing effort to increase their energy storage capability, power capabilities, cycle life and safety characteristics, and decrease their cost. Lithium-ion battery or lithium ion cell refers to a rechargeable battery having an anode capable of storing a substantial amount of lithium at a lithium chemical potential above that of lithium metal.

Historically, non-aqueous secondary (rechargeable) cells using metallic lithium or its alloys as the negative electrode were the first rechargeable cells capable of generating high voltages and having high energy density. However, early on it became clear that their capacity decreased rapidly during cycling, and that their reliability and safety were impaired by the growth of the so-called mossy lithium and lithium dendrites to a degree that precluded these cells from the consumer market. Importantly, the few lithium-metal rechargeable batteries which, from time to time, were being actively marketed, were recommended to be charged at a rate no higher than ca. C/10 (10-hour) rate to minimize the dendritic growth.

To counteract the slow but unavoidable reaction of lithium with the electrolyte components, these early cells typically contained a 4-5 times excess of metallic lithium as compared with the capacity of the positive active material. Thus, the observed capacity fade during cycling was caused by a decrease in the specific capacity of the positive active material. A review of lithium-metal batteries is available (D. Aurbach et al., *Journal of Electrochemical Society*, 147(4) 1274-9 (2000)).

To overcome the difficulties associated with the use of lithium metal negative electrodes, several major improvements in battery materials were introduced. Various types of carbon capable of highly efficient and reversible intercalation of lithium at low potentials were used as the negative electrode to eliminate the growth of lithium dendrites. See, U.S. Pat. Nos. 4,423,125 and 4,615,959. Highly conductive liquid electrolytes have been developed, which are stable at both low and high potentials vs. lithium. See, U.S. Pat. No. 4,957,833. High-voltage, high-capacity positive electrode materials based on lithiated transition metal oxides, such as $LiCoO_2$, $LiMn_2O_4$ and $LiNiO_2$ have been developed. See, U.S. Pat. No. 4,302,518.

Since the electrochemical potential of lithium metal is only ca. 0.1 V lower than the potential of the fully lithiated graphitic carbon electrodes, $LiC_6$, used in Li-ion batteries, both are strongly reducing towards any materials in contact with them, such as the polymer binder and the liquid electrolyte lithium salt solution. In particular, liquid electrolyte components react with both metallic lithium and lithiated carbon to form a metastable protective layer on the surface of the negative electrode materials, the so-called solid-electrolyte interface (SEI) (E. Peled, *"Lithium Stability and Film Formation in Organic and Inorganic Electrolyte for Lithium Battery Systems"*, in *"Lithium Batteries"*, J. P. Gabano, Ed., Academic Press, London, 1983; p. 43).

However, the process of SEI formation and its partial renewal during battery cycling and storage irreversibly consumes a fraction of the active lithium from the battery and results in a loss of capacity. This loss is readily visible when one compares the amount of charge used during the first charge and then the discharge of the battery, a so-called formation cycle. During the first charge cycle of a new Li-ion battery, the positive active material is oxidized and $Li^+$ ions diffuse in the liquid electrolyte towards the carbon negative electrode, where they are reduced to $Li^0$ and intercalated between the graphene layers of the carbon structure. A significant fraction of this first-reduced lithium, up to ca. 50%, but more typically between 5 and 15% of the intercalatable lithium, reacts to form the above-mentioned SEI. Clearly, the amount of Li available in the positive electrode material has to be less than the sum of lithium necessary for the formation of the SEI and the available lithium intercalation capacity of the carbon material. If the amount of lithium removed from the positive electrode material is greater than that sum, the excess lithium will be deposited, or plated, as metallic lithium on the external surfaces of the carbon particles. The plated lithium is in the form of a very reactive high-surface-area deposit, so-called 'mossy lithium', which will not only degrade the battery performance due to its high electrical impedance, but will also seriously compromise its safety.

Even if the lithium intercalation capacity of the carbon material is large enough to accommodate all of the lithium from the positive electrode material, it is possible to plate lithium if the charging is done too quickly.

Due to the strong possibility of lithium plating on the carbon anode during the high-rate charge, manufacturers of Li-ion batteries recommend that such batteries are charged at an equivalent current no greater than one time the nominal cell capacity (1C) until the upper maximum charging voltage is reached, followed by a constant-current (taper) segment (http://www.panasonic.com/industrial/battery/oem/images/pdf/Panasonic_LiIon_Charging.pdf). In practice, the charging step lasts from 1.5 to 2.5 hours, which is too long for certain applications, such as battery-powered tools, certain electronic devices and electric vehicles.

Hybrid electric vehicles are a particularly demanding application for batteries. Hybrid electric vehicles are powered by an energy conversion unit (e.g., a combustion engine or fuel cell), and an energy storage device (e.g., batteries). Hybrid electric vehicles can have a parallel design, in which the energy conversion unit and an electric propulsion system powered by the batteries are connected directly to the vehicle's wheels. In such a design, the primary engine generally is used for highway driving, while the electric motor supplies power when the vehicle is moving at low speeds and during hill climbs, acceleration, and other high demand applications. Series designs are also employed, in which the primary engine is connected to a generator that produces electricity. The electricity charges the batteries, which drive an electric motor that powers the wheels.

The U.S. government has defined performance criteria for batteries to be used in hybrid electric vehicles. See, e.g., U.S. Department of Energy, *FreedomCAR Battery Test Manual for Power-Assist Hybrid Electric Vehicles* (October, 2003). For example, the battery should have a minimum pulse discharge power of 25 kW (for 10 seconds), a minimum peak regenerative pulse power of 20 kW (for 10 seconds), a total available energy of 300 Wh (at $C_1/1$ rate), a cycle life of 300,000 cycles, and a calendar life of 15 years. Maximum weight, volume, and cost are also defined.

Designing lithium-ion batteries having sufficiently high power and sufficiently low impedance growth to meet the requirements for use in a hybrid electric vehicle has proved challenging. Impedance growth detracts from the useful life of a battery. The impedance of a battery grows over time as the battery ages and repeated charge and discharge cycles lead to degradation of the electrode materials. Impedance growth is increased at higher temperatures. Due to the long battery life required for hybrid electric vehicle applications, impedance growth becomes an important factor toward the end of battery life. For cells exhibiting typical impedance growth (e.g., 30-50% over 12 years), battery packs must be oversized, or provided initially with excess capacity, so that they can meet the performance requirements throughout the entire battery life. Oversizing helps reduce the stress on the battery in two ways: 1) it reduces the current or power each cell must deliver and 2) it allows for loss of power or performance, while still meeting the requirements at end-of-life. This oversizing disadvantageously adds to the weight, volume, and cost of the battery packs. Accordingly, Li-ion batteries exhibiting low impedance growth, in addition to high power, are desired for use in hybrid electric vehicles.

SUMMARY

Disclosed herein is a Li-ion battery capable of high charge and discharge rates that is inexpensive to make, safe during extended high-electrical-stress use, having high energy and power capability, and exhibiting low loss of capacity and discharge power after numerous high-rate charge and discharge cycles. The battery is useful in high-rate applications, and can exhibit low impedance growth, allowing for its use in hybrid electric vehicle applications and other applications that rely on the availability of high power over long periods of time. The positive lithium storage electrode and the negative electrode of the cell are both capable of reversibly intercalating lithium at a high rate. The cell does not plate lithium during charging, resulting in negligible capacity fade over many charge cycles. Thus, the high-performance lithium-ion cell is capable of repeated, safe and stable charge and discharge at exceptionally high rates of charge and discharge. For example, such a battery can be charged at 10C rate and discharged at 20C rate, with a capacity loss as little as 0.008% per cycle over more than 1,000 cycles. In addition, the secondary cell can achieve up to 95% state of charge in as little as six minutes.

One aspect provides a lithium secondary cell containing a positive electrode that includes a lithium transition metal phosphate compound, a negative electrode that includes carbon, and an electrolyte in contact with and separating the positive electrode and negative electrode. The cell exhibits impedance growth of no more than about 10% for every 1000 charge-discharge cycles at a temperature of up to 60° C. In some embodiments, the charge-discharge cycles are deep discharge cycles. The cell further includes a positive electrode current collector in electronic communication with the positive electrode and a negative electrode current collector in electronic communication with the negative electrode.

In some embodiments, the cell exhibits a total cell energy capacity decrease of no more than about 20% from the initial cell energy capacity for every 500 charge-discharge cycles at a temperature of up to about 60° C. In some embodiments, the charge-discharge cycles are deep discharge cycles. In certain embodiments, the lithium transition metal phosphate is a compound having the formula $Li_{1-x}MPO_4$, where M is selected from the group consisting of vanadium, chromium, manganese, iron, cobalt and nickel; and $0 \leq x \leq 1$. In certain embodiments, the lithium transition metal phosphate is a compound having the formula $Li_xM'_yM''_aPO_4$, wherein M" is selected from the group consisting of Group IIA, IIIA, IVA, VA, VIA and IIIB metals having an ionic radius less than the ionic radius of $Fe^{2+}$, x is equal to or greater than 0 and a and y are greater than 0. In some embodiments, the lithium transition metal phosphate is a compound having the formula $(Li_{1-x}Z_x)MPO_4$, where M is one or more of vanadium, chromium, manganese, iron, cobalt and nickel, Z is one or more of titanium, zirconium, niobium, aluminum, tantalum, tungsten or magnesium, and x ranges from 0 to about 0.05. In some embodiments, the positive electrode has a specific surface area of greater than about 10 $m^2/g$. In particular embodiments, the negative electrode includes graphitic carbon. In certain embodiments, the carbon is selected from the group consisting of graphite, spheroidal graphite, mesocarbon microbeads and carbon fibers. In some embodiments, the electrolyte in the cell includes about 1.0 M to about 1.3 M $LiPF_6$ and an organic solvent including about 30 wt % to about 50 wt % ethylene carbonate, about 10 wt % to about 20 wt % propylene carbonate, about 20 wt % to about 35 wt % dimethyl carbonate, about 20 wt % to about 30 wt % ethyl methyl carbonate, with an additional about 1 wt % to about 3 wt % vinylene carbonate. In some embodiments, the impedance growth of the cell is logarithmic with respect to time at temperatures up to about 55° C.

Another aspect provides a lithium secondary cell containing a positive electrode that includes a lithium transition metal phosphate compound, a negative electrode that includes carbon, and an electrolyte in contact with and separating the positive electrode and negative electrode. The impedance growth of the cell is logarithmic with respect to time at temperatures up to about 55° C. The cell further includes a positive electrode current collector in electronic communication with the positive electrode and a negative electrode current collector in electronic communication with the negative electrode.

Another aspect provides a lithium secondary cell containing a positive electrode that includes a lithium transition metal phosphate of the formula $Li_xM'_yM''_aPO_4$, where M" is selected from the group consisting of Group IIA, IIIA, IVA, VA, VIA and IIIB metals having an ionic radius less than the ionic radius of $Fe^{2+}$, x is equal to or greater than 0 and a and y are greater than 0. The cell also contains a negative electrode including carbon, and an electrolyte in contact with and separating the positive electrode and negative electrode. The electrolyte includes about 0.8 M to about 1.5 M $LiPF_6$ and an organic solvent including about 30 wt % to about 70 wt % ethylene carbonate, about 0 wt % to about 20 wt % propylene carbonate, about 0 wt % to about 60 wt % dimethyl carbonate, about 0 wt % to about 60 wt % ethyl methyl carbonate, about 0 wt % to about 60 wt % diethyl carbonate, and about 0 wt % to about 5 wt % vinylene carbonate. The sum of the weight percents of ethylene carbonate and propylene carbonate is between about 30 wt % and about 70 wt % of the total organic solvent, and propylene carbonate represents about 30 wt % or less of this sum. The cell further contains a positive electrode current collector in electronic communication with the positive electrode and a negative electrode current collector in electronic communication with the negative electrode.

Another aspect provides a battery pack for use in a hybrid electric vehicle that includes a plurality of lithium secondary cells connected in series, in parallel, or in a combination thereof. Each cell in the pack includes a positive electrode that includes a lithium transition metal phosphate compound, a negative electrode including carbon, and an electrolyte in contact with and separating the positive electrode and negative electrode. The electrolyte includes about 0.8 M to about 1.5 M LiPF$_6$ and an organic solvent including about 30 wt % to about 70 wt % ethylene carbonate, about 0 wt % to about 20 wt % propylene carbonate, about 0 wt % to about 60 wt % dimethyl carbonate, about 0 wt % to about 60 wt % ethyl methyl carbonate, about 0 wt % to about 60 wt % diethyl carbonate, and about 0 wt % to about 5 wt % vinylene carbonate. The sum of the weight percents of ethylene carbonate and propylene carbonate is between about 30 wt % and about 70 wt % of the total organic solvent, and propylene carbonate represents about 30 wt % or less of the sum. The cell further contains a positive electrode current collector in electronic communication with the positive electrode, and a negative electrode current collector in electronic communication with the negative electrode.

Yet another aspect provides a battery pack for use in a hybrid electric vehicle comprising a plurality of lithium secondary cells connected in series, in parallel, or in a combination thereof. The cell includes a positive electrode including a lithium transition metal phosphate compound, a negative electrode including carbon, and an electrolyte in contact with and separating the positive electrode and negative electrode. The cell components are selected to achieve impedance growth of no more than about 10% for every 1000 charge-discharge cycles at a temperature of up to about 60° C. and a total cell energy capacity decrease of no more than about 20% from the initial cell energy capacity after 500 charge-discharge cycles at a temperature of up to about 60° C. In some embodiments, the charge-discharge cycles are deep discharge cycles. In addition, each cell in the plurality of cells has a total discharge capacity of at least about 1 Ah. The cell further includes a positive electrode current collector in electronic communication with the positive electrode and a negative electrode current collector in electronic communication with the negative electrode.

A further aspect provides a battery pack for use in a device comprising a plurality of lithium secondary cells connected in series, in parallel, or in a combination thereof to provide a voltage sufficient to operate a motor. Each cell has an available power at the beginning of life that is no more than about 20% greater than a predefined power at end of life. In some embodiments, the device is a vehicle.

As used herein, unless specified otherwise, the electrical resistivity or impedance, e.g., total opposition that a battery offers to the flow of current (e.g., alternating current or direct current), is given in units of ohm, charge and discharge capacity in units of ampere hours per kilogram of the storage material (Ah/kg) or milliampere hour per gram of storage material (mAh/g), charge and discharge rate in units of both milliamperes per gram of the storage compound (mA/g), and C rate. When given in units of C rate, the C rate is defined as the inverse of the time, in hours, necessary to utilize the full capacity of the battery measured at a slow rate. A rate of 1C refers to a time of one hour; a rate of 2C refers to a time of half an hour, a rate of C/2 refers to a time of two hours, and so forth. Typically, the C rate is computed from the rate, in mA/g, relative to the capacity of the compound or battery measured at a lower rate of C/5 or less. "State of charge" (SOC) refers to the proportion of the active material still unused according to Faraday's Law. In the case of a battery, it is the proportion of the cell's capacity that is still unused, with respect to its nominal or rated capacity. A fully charged battery has SOC=1 or 100%, whereas a fully discharged battery has SOC=0 or 0%. Area specific impedance (ASI) refers to the impedance of a device normalized with respect to surface area and is defined as the impedance measured at 1 kHz ($\Omega$), using an LCZ meter or frequency response analyzer, multiplied by the surface area of opposing electrodes (cm$^2$).

BRIEF DESCRIPTION OF THE DRAWINGS

A more complete appreciation of the present invention and many of its advantages will be understood by reference to the following detailed description when considered in connection with the following drawings, which are presented for the purpose of illustration only and are not intended to be limiting, and in which.

DETAILED DESCRIPTION

New battery applications demand continuous improvements in battery discharge rate capabilities and a corresponding decrease in charge times. However, when a conventional Li-ion battery is charged at a relatively high rate, e.g., greater than 2C, a decrease in the negative electrode potential due to impedance brings the negative electrode below the potential at which lithium plating occurs. This voltage drop may be due to ohmic resistance, concentration polarization, charge transfer resistance, and other sources of impedance.

Figure 1:
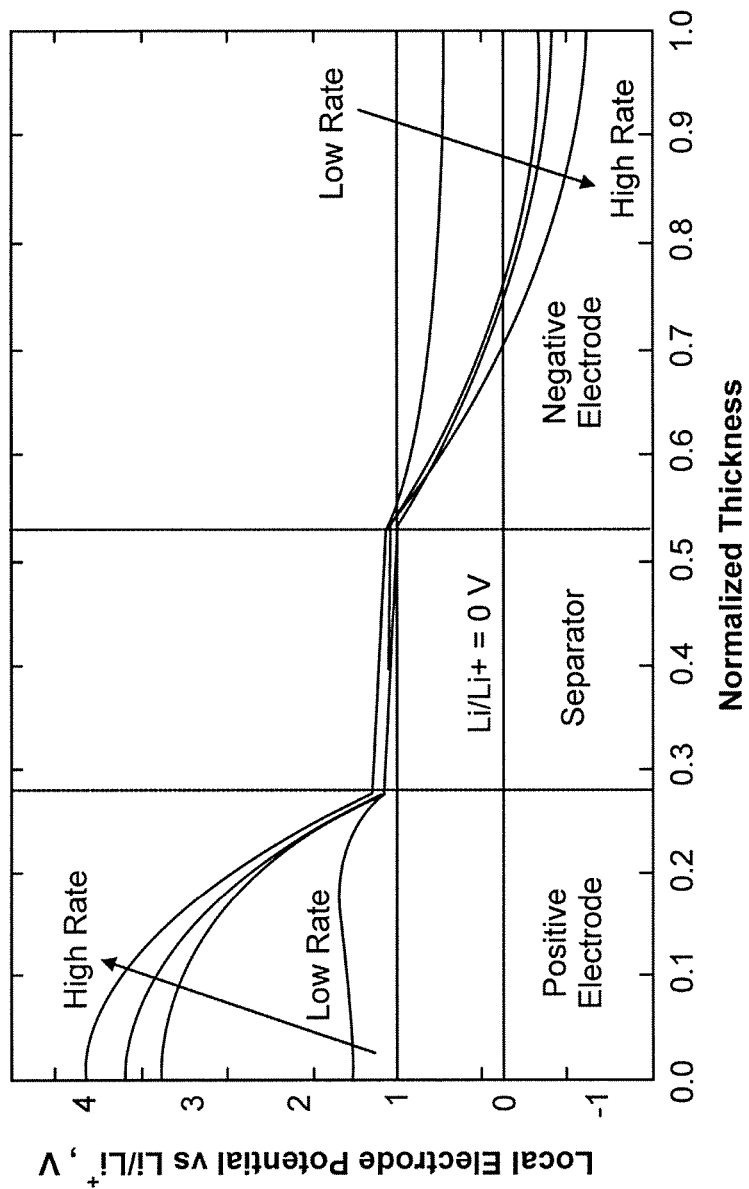
FIG. 1 is a schematic illustration of the local potential (voltage) at various locations across the normalized thickness of the cell during low and high-rate charge cycles in a lithium-ion cell.

This phenomenon is illustrated in FIG. 1, which is a schematic illustration of the local potential (voltage) at various locations across the normalized thickness of a conventional lithium-ion cell. The locations of the positive electrode, separator and negative electrode are indicated. A series of curves indicates the potential for different illustrative charge rates. Arrows in the figure indicate the trend for increasing rate. As the battery is charged at higher rates, the positive electrode potential is pushed to a higher potential and the negative electrode drops to a lower potential. At high rates, the potential at the negative electrode drops to below 0 V vs. Li/Li$^+$ and plating of lithium metal at the negative electrode occurs. Note that the potential of the separator changes little over a wide range of charge rates.

Figure 2:
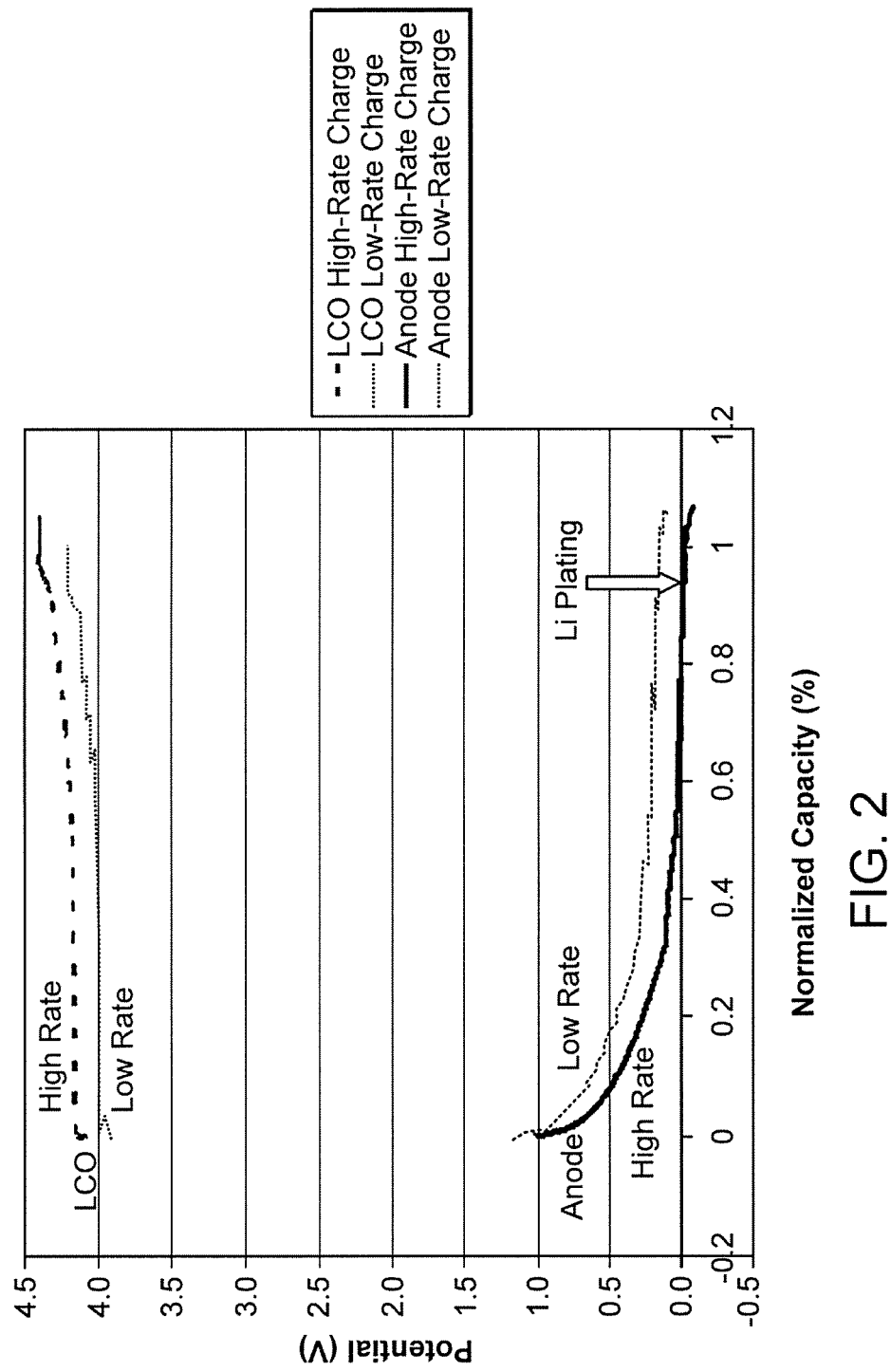
FIG. 2 shows a schematic of the electrode potentials during low and high-rate charge cycles in a LiCoO$_2$-graphite anode cell; note that the anode potential drops below 0 V vs Li/Li+, the lithium plating potential, during high rate charge.

During a high rate-constant current charge, total cell voltage is increased to allow the high charging current to be accommodated. If the cell has high impedance, it must be driven at a higher voltage to achieve the same current flow. FIG. 2 is a schematic illustration of the positive and negative electrode potentials of a conventional LiCoO$_2$ ("LCO")-graphite cell, which has a relatively high impedance (ca. 40 Ω-cm$^2$) over the entire state of charge. At low charge rates, the negative electrode potential remains above the lithium plating potential. During high rate discharge, however, the negative electrode potential is driven so low that the negative potential drops below the lithium plating potential (0 V vs Li/Li$^+$). Lithium plating at the anode takes place under the conditions indicated by the arrow in FIG. 2. Clearly, the high rate-constant current charge of a high-impedance cell results in the undesirable plating of lithium.

Figure 3:
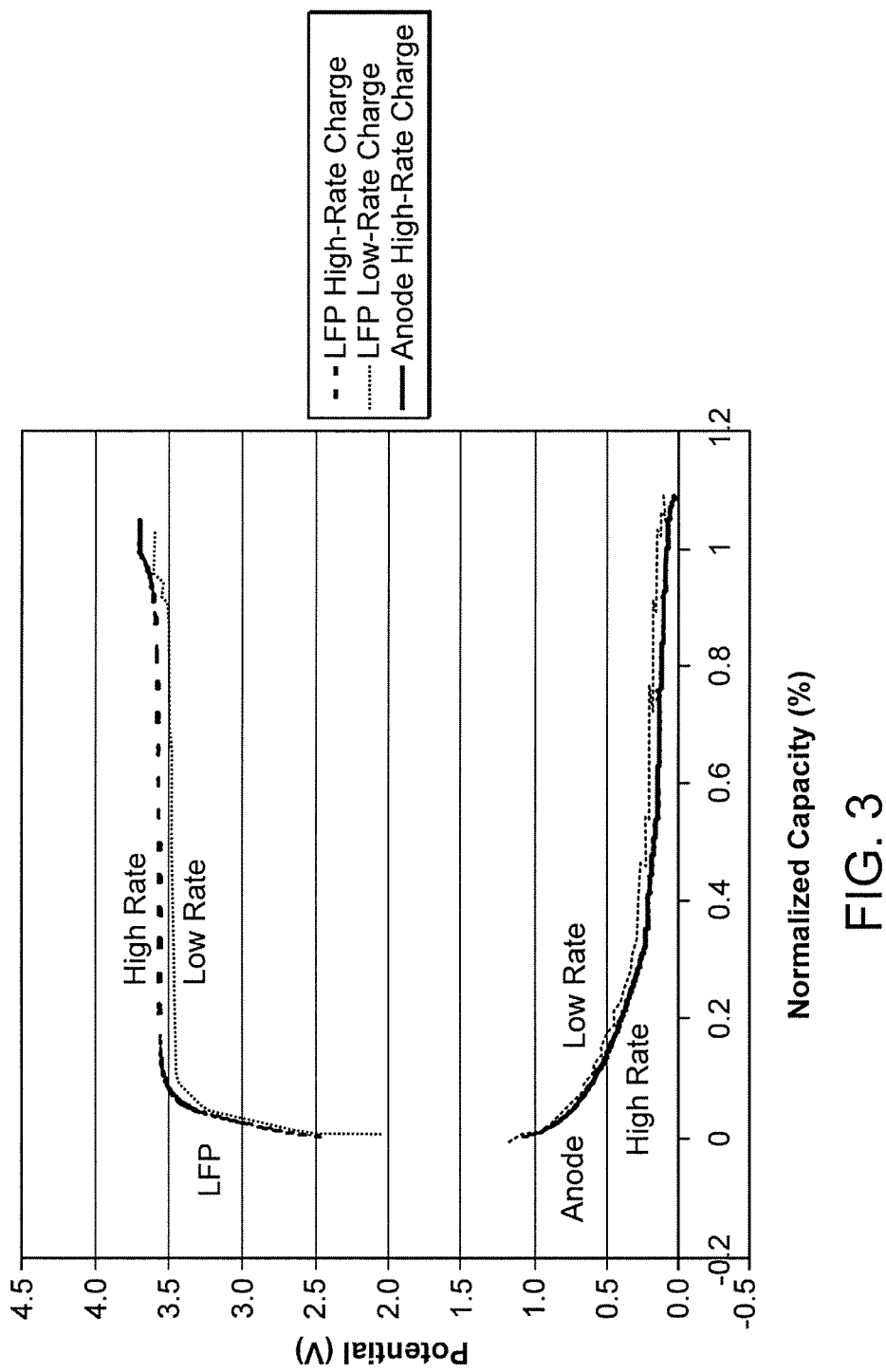
FIG. 3 shows a schematic of the electrode potentials during low and high-rate charge cycles in a LiFePO$_4$-graphite anode cell; note that the anode potential does not drop below 0 V vs Li/Li+, the lithium plating potential, during the charging cycle.

A low impedance Li-ion cell as described herein is illustrated in FIG. 3. In a low-impedance cell according to one or more embodiments of the present invention, the negative electrode does not plate lithium. FIG. 3 shows the positive and negative electrode potentials for a LiFePO$_4$ ("LFP")-graphite cell with an exemplary total area specific impedance (ASI$_{tot}$) of about 12 Ω-cm$^2$. During the entire high rate-constant current charging of the LiFePO$_4$-graphite cell, the potential at the negative anode remains above the potential of lithium metal. Fast charge capability with low susceptibility to lithium plating is important, for example, for regenerative braking in hybrid electric vehicle applications.

The positive and negative electrodes represent the greatest contribution to the total area specific impedance (ASI$_{tot}$) of the cell. The impedance of the separator, and the various connecting metal parts of the cell such as the tabs, the current collector foils or grids and the electrode-current collector interfacial resistance generally contribute between about 10-20%, and typically about 15%, of the total area specific impedance (ASI$_{tot}$).

According to one or more embodiments, the impedance of the negative electrode is at a minimum. In a typical Li-ion cell according to one or more embodiment, the area specific impedance of the negative electrode (ASI$_a$) is less than about 3.0 Ω-cm$^2$, or less than about 2.5 Ω-cm$^2$, or less than 2.0 Ω-cm$^2$, or less than 1.8 Ω-cm$^2$, or less than 1.5 Ω-cm$^2$.

A further feature of a high rate, low impedance Li-ion cell is that the positive electrode bears a predominant amount or even a major amount of the total cell impedance (ASI$_{tot}$), while the total cell impedance remains low. In one or more embodiments, up to 70% of the cell impedance is localized at the positive electrode. In particular, the ratio of area specific impedance of the positive electrode (ASI$_c$) to the area specific impedance of the negative electrode (ASI$_a$) is greater than about three. In other embodiments, the ratio of area specific impedance of the positive electrode (ASI$_c$) to the area specific impedance of the negative electrode (ASI$_a$) is in a range of about 3-10, or is greater than about 4, greater than about 5, greater than about 6, greater than about 7, greater than about 8, greater than about 9, or greater than about 10.

The total area specific impedance of the cell (ASI$_{tot}$) is low and is typically less than 20 Ω-cm$^2$. The total area specific impedance (ASI$_{tot}$) can be less than 18 Ω-cm$^2$, or less than 16 Ω-cm$^2$, or less than 14 Ω-cm$^2$, or less than 12 Ω-cm$^2$, or less than 10 Ω-cm$^2$ or less than 8 Ω-cm$^2$. The smaller the value for the total area specific impedance (ASI$_{tot}$), the smaller the proportion of the total impedance required to be borne at the positive electrode in order to prevent lithium plating. Table 1 lists an exemplary relationship between total area specific impedance (ASI$_{tot}$) and the area specific impedance at the positive electrode (ASI$_c$) for an exemplary Li-ion cell according to one or more embodiments of the present invention.

TABLE 1

| | $ASI_{tot}$ ($\Omega$-cm$^2$) | | | | | | |
|---|---|---|---|---|---|---|---|
| | 8 | 10 | 12 | 14 | 16 | 18 | 20 |
| $ASI_c/ASI_a$ | 3 | 4 | 5 | 6 | 7 | 9 | 10 |

Surprisingly, Li-ion cells according to one or more embodiments achieve high charge rates in cells having thick electrode layers, e.g., a positive electrode layer of about 50 µm to about 125 µm on one side of the current collector. While thicker electrode layers provide higher charge capacity, the thicker layers also typically increase the impedance of the electrodes (by, for example, increasing the distance and the tortuosity of the lithium diffusion pathway). In a single cell consisting of a positive and negative electrode in ionic contact with one another through the electrolyte, the areal charge capacity is one-half of the measured areal capacity for the double-sided electrode, e.g., at least about 0.75 mA-hr/cm$^2$. It has been surprisingly discovered that a Li-ion cell having areal charge capacities of at least about 0.75 mA-hr/cm$^2$, or about 1.0 mA-h/cm$^2$ or about 1.5 mA-hr/cm$^2$ are capable of high rate charge and discharge without plating lithium at the negative electrode.

An earlier method of obtaining high charge and discharge rates was to reduce the areal capacity of the cell, e.g., by using very thin electrodes. A very thin electrode (i.e., with a low areal capacity) could achieve high charge and discharge capacity at high rates; however, the low mass/volume of the electrode in the cell would not result in a practical device. The cell according to one or more embodiments described herein provides both high rate capability AND high charge capacity.

In one or more embodiments, a high capacity Li-ion cell is charged and discharged at a high rate, e.g., greater than 2C, greater than 4C, or greater than 10C, or even at 20C, without significant capacity fade. The cell can be initially charged by the galvanostatic (constant current) method to target voltage, e.g., 3.6-3.8 V for a LiFePO$_4$—C cell, using a high C-rate (2, 5, 10, or 20C.) After the target voltage is reached, a potentiostatic segment can be applied until the current decreases to a C/20 rate (CC-CV protocol or taper charge method), which is considered to be 'fully charged' or state of charge. The time to achieve state of charge is very fast, e.g., less than 15 minutes, with low levels of cell heating. This can be compared to a low charge rate of 1C, requiring 60 minutes for state of charge.

The inventors have found that the batteries made according to one or more embodiments as described herein show surprisingly low fade rate when charged at a high rate. For batteries charged at 10C, high capacity lithium-ion cells show less than about 0.2% loss per cycle, about 0.1% loss per cycle, about 0.05% loss per cycle, and about 0.025% loss per cycle.

In one or more embodiments, the Li-ion cell charges at 4C-rate and reaches about 90%, or even about 95%, state of charge within 15 minutes. Other Li-ion cells charge at 10C-rate and achieve about 80%, or even about 90%, state of charge within 6 minutes. The Li-ion cells also possess superior discharge rate capabilities as compared to conventional Li-ion cells. Li-ion cells according to one or more embodiments of the present invention demonstrate 10C capacity of greater than about 70%, or about 80% or about 90%, or even about 95% of nominal capacity measured at C/10.

In another embodiment, the lithium-ion battery can be charged to potentials well above the standard charging potential, in order to charge the battery more quickly. In a conventional 4.2V lithium-ion battery, such as one that contains LiCoO$_2$, the maximum charging current is also limited by the potential at the positive electrode. A high potential at the positive electrode will cause electrolyte oxidation, which greatly decreases the lifetime of the battery. Lithium iron phosphate has a lower average voltage during charge. Thus, a positive electrode incorporating lithium iron phosphate as the active material can be polarized to a greater extent before reaching the electrolyte oxidation potential.

In certain embodiments, transition metal phosphate positive electrode materials are charged using a larger overpotential with respect to the open-circuit voltage (OCV) because of the low average cell voltage and high stability of the positive electrode material in its delithiated state. As a result, there is no excess lithium in the positive electrode when the cell is in the fully charged state. In contrast, conventional positive electrode materials, using LiCoO$_2$ for example, cannot be charged to potentials greater than 4.2V because of its instability in the delithiated state. The larger overpotential at the positive electrode, i.e., the potential above the standard charging potential, allows the cell to be charged at a high, constant current for a longer period of time before the charging current must be decreased or before the cell is placed on a potentiostatic, or constant voltage, hold. The larger overpotential is achievable at an absolute voltage that remains sufficiently low to avoid electrolyte oxidation at the positive electrode. Thus, the cell can be charged more quickly without danger of electrolyte oxidation. The overpotential capability of the positive electrode material is particularly useful when combined with a low-impedance negative electrode (or a higher positive electrode-to-negative electrode impedance ratio ($ASI_c/ASI_a$)), as described in herein. Note that a high impedance negative electrode alone would not be useful because lithium would plate onto the anode regardless of the positive electrode potential.

Typically, the rate capability of a cell is determined by a constant current or constant power continuous discharge, which gives rise to a Ragone plot. In one embodiment, the discharge energy density of the battery is at least about 85 Wh/kg at a power density of at least about 750 W/kg. Ragone plots are used to describe energy density during discharge, not charge. So other methods are used to describe the high charge capability of this invention.

According to one or more embodiments, a Li-ion cell is provided for which the resistance of the components contributing to the voltage drop at the negative electrode are minimized. Factors affecting the impedance (and hence rate capability) at the negative electrode itself during high-rate discharge include electrode thickness, bulk electronic conductivity, contact resistance between current collector and active material particles, average size of active material— typically carbon—particles, Li$^+$ diffusion coefficient in the active material, electrode porosity, pore size distribution and tortuosity, ionic conductivity of the liquid electrolyte, and transference number of Li$^+$ in the liquid electrolyte. The factors listed above that strongly affect the negative electrode's rate capability are equally important in the case of the positive electrode as well.

A Li-ion battery capable of safe and long-term operation at a high rate of charge and discharge without a significant loss of power and capacity and a method of its manufacture is described in detail herein. The positive and negative electrodes are designed at the (1) active particle level, (2) electrode level, and (3) cell level to maximize rate, reduce impedance, in particular at the negative electrode, while maintaining a high charge capacity.

In certain embodiments, the cell exhibits low impedance growth, which is useful to provide improved battery life, for example, in hybrid electric vehicle applications and other high demand applications. In particular embodiments, the cell is a high power battery that does not show significant impedance growth during high power cycling and/or high temperature and/or long term storage. Due to the long battery life required for hybrid electric vehicle applications, impedance growth becomes an important factor, especially toward the end of battery life. Conventional battery packs composed of multiple cells are often oversized, or provided initially with excess capacity, so that they can meet the performance requirements throughout the entire battery life. This oversizing disadvantageously adds to the weight, volume, and cost of the battery packs. In at least some embodiments, cells as described herein exhibit low impedance growth, or even a decrease in impedance over time, allowing for their use in battery packs for hybrid electric vehicles with a lesser degree of oversizing than typical packs.

Figure 19:
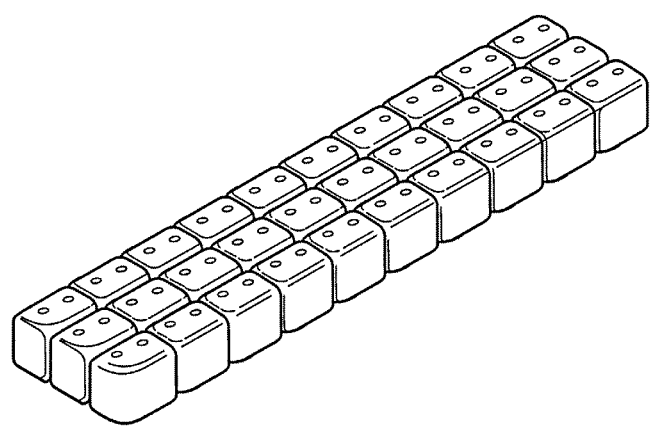
FIG. 19 is a perspective view of a battery pack.

As described herein a battery pack refers to a plurality of cells arranged in series, parallel, or a combination thereof. FIG. 19 shows an example of a battery pack having cells arranged in both series and parallel. In some embodiments, the cells are connected in series to achieve a selected voltage for the total battery pack, e.g., to operate for an intended use (e.g., an HEV application may require a voltage of about 330V, while a motor starter may require about 36V). In other embodiments, cells of a selected capacity are connected in parallel to achieve a selected current, e.g., the current required to operate the device for an intended use (e.g., for use in an HEV or for an application that requires high energy or high capacity). Various combinations of cells connected in series and parallel will be apparent to those of skill in the art to achieve the particular voltage and current requirements of the intended use. Because the cells described herein are particularly well suited for applications where features such as high power and long battery life are important, it will be understood by those of skill in the art that battery packs composed of these cells also can be used in applications other than HEVs where high power and long battery life are important.

In some embodiments, the batteries as described herein are covered with an exterior member. The exterior member includes, for example, heat-shrinkable tubing, adhesive tape, metal film, paper, cloth, paint, and a plastic casing. Further, in some embodiments, at least part of the exterior member may be provided with a section that will change in color owing to heat, so that the thermal history in use can be seen.

In some embodiments, the battery pack described herein is provided with safety elements, such as a positive temperature coefficient resistor, a thermal fuse, a fuse and/or a circuit breaking element, as well as a safety circuit (a circuit that is for monitoring, for example, the voltage, the temperature, and the electric current of each battery and/or the set of the batteries, and, if necessary, the circuit has a function for breaking the current). Further, in certain embodiments, the battery pack is provided with, in addition to the positive electrode terminal and the negative electrode terminal of the set of the batteries, for example, a positive electrode terminal and a negative electrode terminal for each of the batteries, temperature detection terminals for the set of the batteries and for each of the batteries, and a current sensing terminal for the set of the batteries, as outer terminals. Further, in some embodiments, the battery pack may have a built-in voltage-converting circuit (e.g., a DC-DC converter). In some embodiments, the connection between the batteries may be fixed by welding lead plates, or it may be fixed for easy detachability by using sockets or the like. Further, in certain embodiments, the battery pack may be provided with a function for displaying, for example, the remaining capacity of the batteries, whether or not charging has been done, and how often the battery pack has been used.

The cells described herein can be used in various devices. In particular, the cells described herein are used in applications requiring high power and/or long-term use with good electrochemical stability. Certain applications include, without limitation, hybrid electric vehicles, alternative energy storage (e.g., solar and wind), uninterrupted power systems, medical devices (e.g. defibrillators), and space vehicles (e.g., satellites).

The U.S. Department of Energy, *FreedomCAR Battery Test Manual for Power-Assist Hybrid Electric Vehicles* (October, 2003) defines an "available energy" requirement of 300 Wh in the range of SOC where a battery pack for a hybrid electric vehicle (HEV) can provide both the necessary discharge and regenerative pulses. The *FreedomCAR Battery Test Manual* describes a hybrid pulse power characterization (HPPC) test, which provides a measurement of dynamic power capability over a cell's useable charge and voltage range. The available energy of a pack depends on the shape of its HPPC curves, and how much its impedance grows over time. Packs for HEV applications are generally oversized to allow some increase of impedance over the lifetime of the pack and reduction of available energy. Typical packs engineered to meet the DOE "available energy" requirement contain, for example, 2000+ Wh of total energy. In contrast, in certain DOE-compliant embodiments, a pack made up of cells as described herein is projected to have an energy of only about 1400 Wh. Thus, the pack made up of cells as described herein is oversized to a lesser extent, e.g., initially including about 20%, and in some instances about 30% or about 40%, less energy than conventional packs, while still meeting performance objectives. In some embodiments the lower degree of oversizing for the cells as described herein is determined by comparing the cell power at the end of life with the power at the beginning of life.

Another concept relating to the size of a battery pack is the battery size factor (BSF), or number of cells required to make a battery pack meeting the FreedomCAR performance goals. When more cells are included in a battery pack (corresponding to a higher BSF), each cell sees a smaller current and has a smaller percent depth of discharge removed during each pulse. Conventional battery packs may increase the number of cells in order to maintain the required energy for a desired state of charge. This, of course, increases the size, weight and cost of the pack. Because the cells described herein can maintain current over a wide state of charge and discharge, in particular at high C rates, due to the low cell impedance, oversizing is not required.

Figure 8:
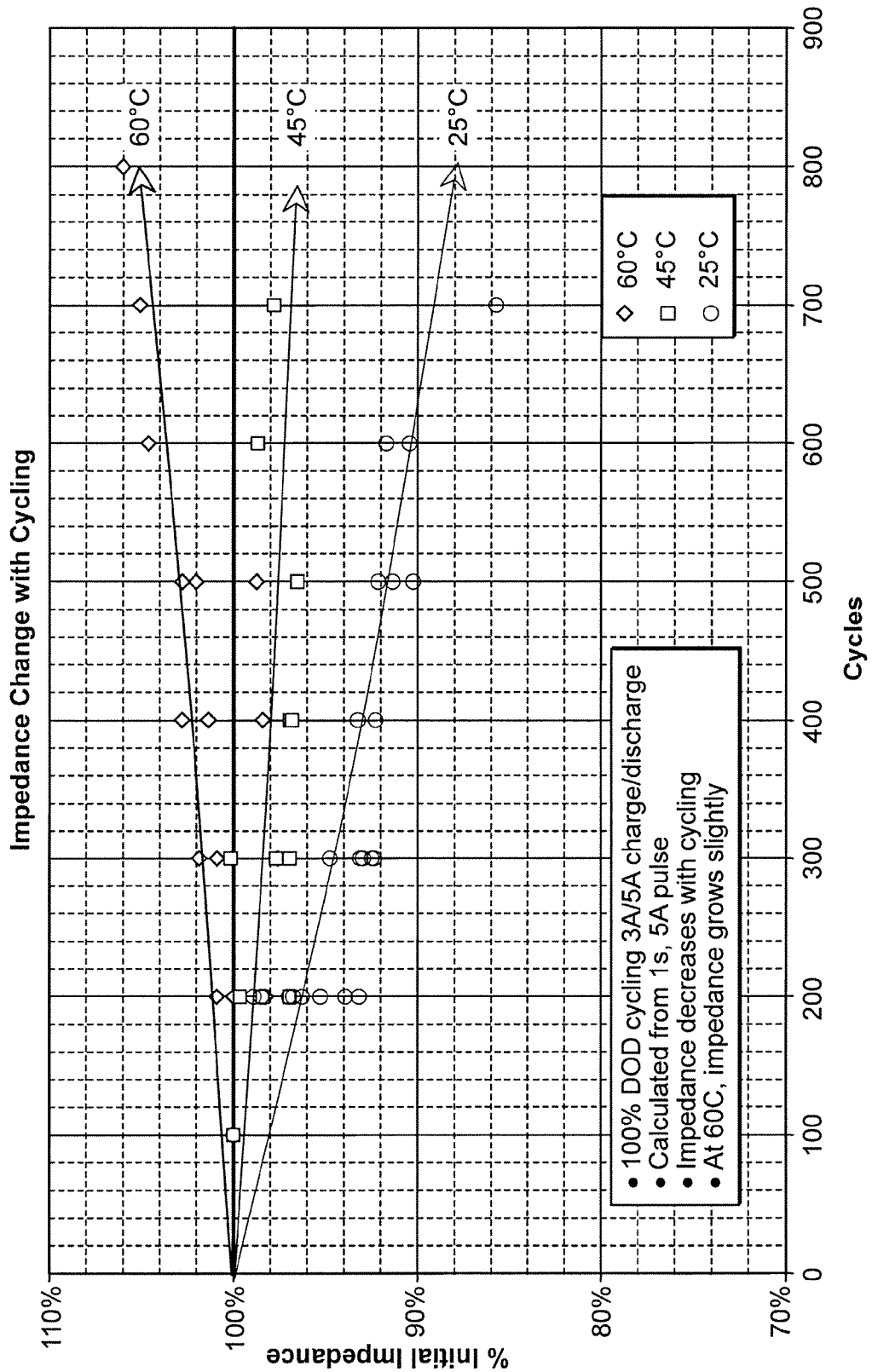
FIG. 8 is plot showing impedance change with cycling at 25° C., 45° C., and 60° C. for a lithium-ion battery according to certain embodiments.

The low impedance growth provided by cells as described herein is truly remarkable, and can actually result in a reduction in total impedance ($ASI_{tot}$). Reduction in impedance, as well as reduction in impedance growth, has been demonstrated experimentally, as described in more detail in the Examples below. For example, as illustrated in FIG. 8, in cycling from 0 to 100% depth of discharge, a cell can exhibit an impedance decrease with cycling at moderate temperatures (25° C. and 45° C.), and only slight impedance increase with cycling at higher temperature (60° C.). By "low impedance growth," it is meant that the cell impedance increases by less than about 10% for every 1000 charge/discharge cycles at a temperature of up to 60° C. In some embodiments, the cell impedance increases by less than about 9% or less than about 8%, for every 1000 charge/discharge cycles at a temperature of up to 60° C. In some embodiments, low impedance growth is determined with deep discharge charge-discharge cycles, for example, greater than 50%, 60%, 70%, 80%, or 90% depth of discharge. In some embodiments, "deep discharge" refers to 100% depth of discharge.

Cells as described herein also can exhibit low total cell energy capacity decrease or low total cell energy decrease, another indicia of low impedance growth. In some embodiments, the total cell energy or capacity decrease is not more than about 20% from the initial cell energy for every 500 charge-discharge cycles at a temperature of up to about 100° C. In some embodiments, the total cell energy or capacity decreases by less than about 18%, or less than about 16%, or less than about 14%, or less than about 12%, or less than about 10%, for every 500 charge/discharge cycles at a temperature of up to 100° C. In some embodiments, the total cell energy (or capacity) is determined with deep discharge charge-discharge cycles, as described above.

Figure 11:
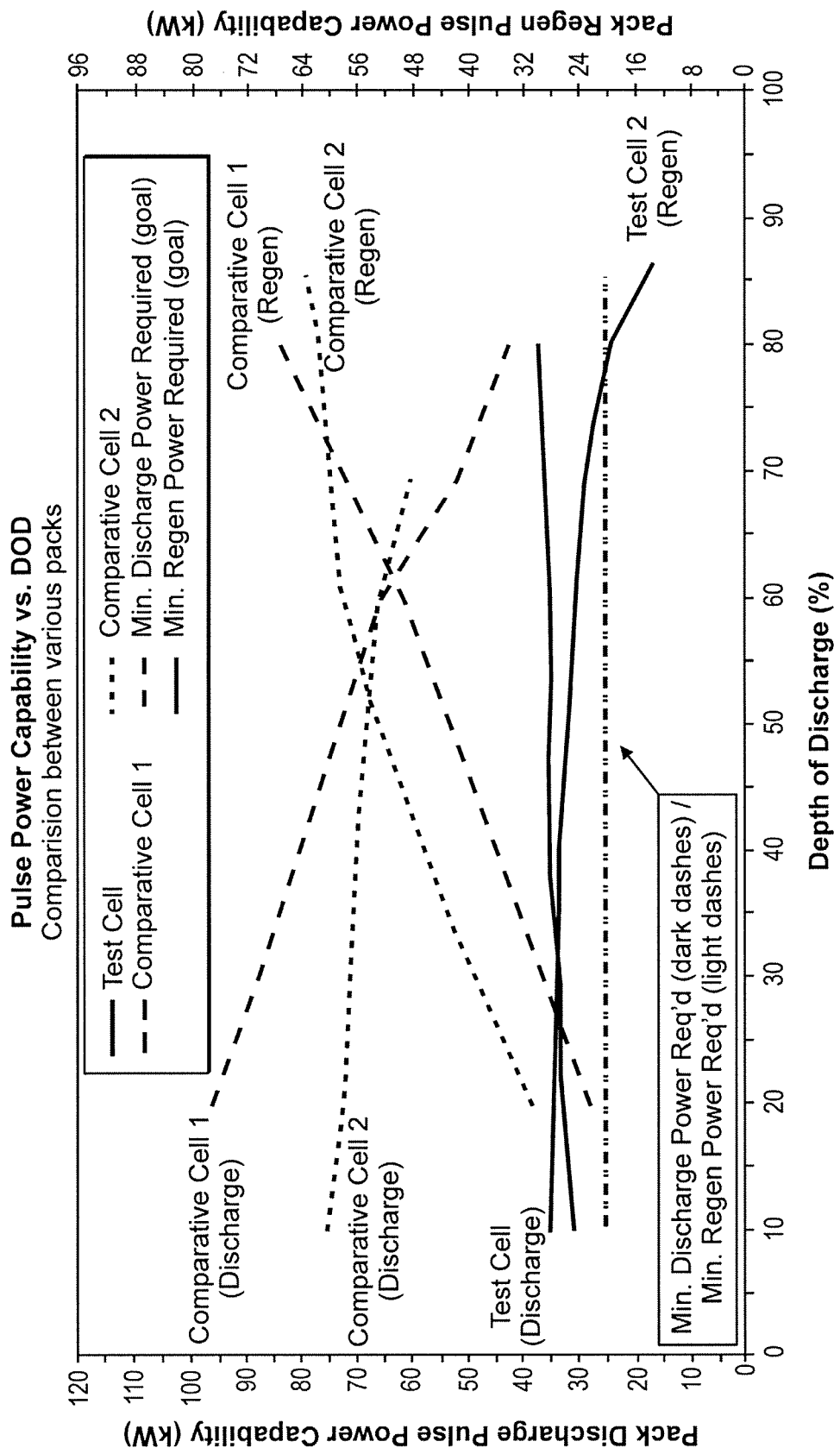
FIG. 11 is a plot showing the hybrid pulse power characterization (HPPC) performance for a lithium-ion battery according to certain embodiments, and two comparative lithium-ion batteries. The comparative lithium-ion batteries exhibit higher pulse power, presumably due to oversizing, and exhibit more steeply sloped curves, indicating a more rapid decrease in available energy with impedance growth.

As described in more detail in the Examples below, cells as described herein also can exhibit good hybrid pulse power characterization (HPPC) performance, indicating their suitability for use in hybrid electric vehicle applications. FIG. 11 shows comparative HPPC performance results for a cell as described herein (solid lines) and two comparative lithium-ion batteries (long and short dashed lines). The two comparative cells exhibit higher pulse power, as exhibited by the HPPC curves being shifted upwards, presumably due to costly oversizing to allow the battery pack to meet performance requirements at the end of life, and a more rapid decrease in available energy with impedance growth.

In some embodiments, the available power at the beginning of life is no more than about 10% to about 30% greater than a predefined power at end of life, for example no more than about 30%, no more than about 25%, no more than about 20%, no more than about 15% or no more than about 10%. In some embodiments, the available power at the beginning of life is about 10% to about 30% greater than a predefined power at end of life. In some embodiments, the available power at the beginning of life is about 10% to about 20% greater than a predefined power at end of life. In some embodiments, the beginning and end of life available power is determined with reference to HPPC curves. For example, the pulse power for a cell at a particular state of charge is determined at beginning of life. This value is compared to the pulse power for the cell at the same state of charge at the end of life. In some embodiments, pulse power comparisons are performed at a 40-60% SOC (corresponding to 60-40% depth of discharge). In some embodiments, pulse power comparisons are performed at 40% SOC, 50% SOC or 60% SOC. In some embodiments, e.g., for hybrid electric vehicle applications, end of life is considered the point at which the available energy is 300 Wh.

As explained herein, in typical systems, the HPPC curves shift down due to impedance growth. Thus, conventional systems must oversize to accommodate for the reduction in capacity due to the impedance growth. Oversizing (e.g., by adding more cells to the pack), increases the pack's power capability and available energy. In an HPPC plot, this increase is shown by discharge and regen curves that are shifted upwards. Oversizing is required due to the loss of power that occurs with cycling and/or time. If there was no loss of power or energy with time, the pack could be sized with the exact minimum number of cells required to meet the energy and power requirements from the beginning-of-life. However, because batteries lose power with time and/or cycling, additional cells are required to allow for this degradation. Technologies that suffer from relatively large degrees of degradation require a greater degree of oversizing.

The shape of the discharge and regen curves in the HPPC plot are also important in determining the amount of oversizing required for an application. When the discharge and regen curves are steep, the available energy is a small fraction of the total energy of the pack. Accordingly, to ensure that the battery can produce the required discharge and regen pulses at any given moment, the battery must be operated in a narrow range of state-of-charge. As a consequence of operating within the narrow SOC range, a portion (in some embodiments, a majority) of the battery's energy is never used. In contrast, when the discharge and regen curves are relatively shallow or flat, the battery can be operated over a wide range of SOC. As a result, more of the battery's energy can be used.

In some embodiments, the battery is considered to have reached its end of life when it can no longer meet the discharge and regen pulse power requirements, over a the required range of state-of-charge for the application. For example, referring to the Freedom CAR requirements, when a battery can no longer meeting the pulse power requirements over a range of state-of-charge corresponding to 300 Wh available energy, the battery is considered to be at the end of life. In some embodiments, end of life occurs as the battery loses discharge and/or regen pulse power capability. In some embodiments, end of life also occurs as battery loses energy. In some embodiments, loss of power is the cause for the battery to reach its end of life.

Because of the low impedance growth of the cells as described herein, however, they do not require as much oversizing to achieve a predefined end of life available energy requirement. Accordingly, the beginning of life available energy is smaller relative to the required end of life available energy requirement (i.e., the HPPC curves do not shift downward significantly). As such, smaller and more cost-effective cells and battery packs can be used for high power applications requiring long battery life. In addition, because the HPPC discharge and regeneration curve of the cells as described herein are much flatter (smaller slope) than those of conventional lithium ion cells, the cells as described herein are able to meet the discharge and regen requirements over a wide range of state of charge.

The low impedance growth of the cells described herein also imparts a unique cycle life model relative to conventional lithium ion cells. In some embodiments, the impedance growth of the cells described herein is logarithmic with respect to time (e.g., months of storage or battery life) and/or cycles. The impedance growth of conventional lithium secondary cells is typically linear with respect to time. H. J. Ploehu, et al., "Solvent Diffusion Model for Aging of Lithium-Ion Battery Cells" *J. Electrochem. Soc'y* 151(3): A456-A462 (2004). As such, the rate of increase in impedance (or decrease in capacity), as judged by the slope of the curve of impedance growth versus time, is higher as the battery nears end of life compared to the beginning of life. Accordingly, the decay increases as the battery ages. In contrast, for the cells as described herein, the rate of increase in impedance decreases over the course of time, which is a surprising and unexpected result. For example, the impedance growth is initially relatively fast, but is followed by a slower rate of decay. Thus, the impedance growth curve becomes flatter (smaller slope) at later time points than at the beginning of battery life. A logarithmic cycle life model is identified by any art-recognized method, such as, for example, plotting the capacity loss or impedance growth versus time and evaluating the shape of the curve to determine if it follows a well-known logarithmic shape. Alternatively, as shown by the dotted line in FIGS. 16*a* and 16*b*, the shape of the impedance growth curve is determined by performing a linear regression analysis of a semi-log plot of capacity loss or impedance growth versus time. If the linear regression fit represents a good fit of the data as determined by standard analytical techniques (e.g., by comparison of R-square values for various models (e.g., power, quadratic, square root of time, logarithmic), where the model with the highest R-square value is selected for modeling the cycle life), a logarithmic rate of decay is demonstrated. In some embodiments, the impedance growth is logarithmic for storage or cycling conditions less than or equal to about 55° C., for example, about 45° C., about 38° C., or about 25° C.

Without being bound by any particular interpretation, it is believed that several factors may contribute to the low impedance growth of a cell as described herein. As an initial matter, the factors used to develop a low impedance battery as described herein also may contribute to low impedance growth. Also, the choice of electrode material and/or the choice of electrolyte composition contribute to the low impedance growth of the cell. Specific electrode compositions for low impedance growth cells are described in more detail below. Specific electrolyte compositions for low impedance growth cells are described in more detail below. In some instances, the electrode composition contains a lithium transition metal phosphate. In some instances, the electrolyte composition contains $LiPF_6$, ethylene carbonate and one or more of propylene carbonate, dimethyl carbonate, ethyl methyl carbonate, diethyl carbonate, and vinylene carbonate.

Figure 5:
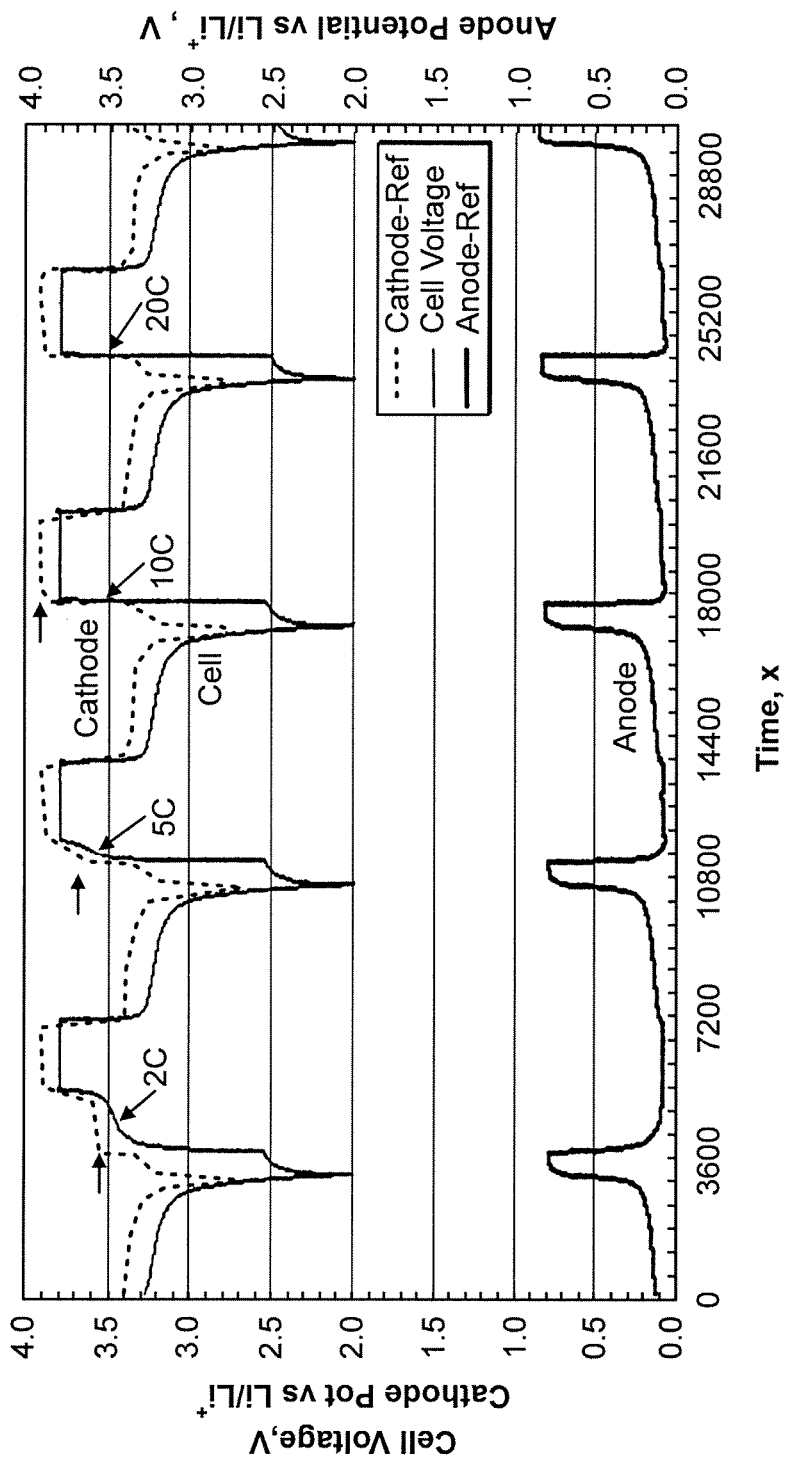
FIG. 5 illustrates voltage profile curves in a reference electrode during charge at 2C, 5C, 10C and 20C for a lithium ion test cell constructed according to one or more embodiments of the present invention.

In certain embodiments, an electrolyte composition is chosen in combination with electrode active materials to provide a cell that has low operating voltage, being less than about 4.2V, and a solid electrolyte interface (SEI) layer that is stable during high power and/or high temperature storage and/or cycling. The electrode active material defines the voltage of the cell; the difference between the potential (voltage) of the cathode and anode is the cell voltage. A low operating voltage is desirable because it allows for higher current charge without oxidizing the electrolyte, thus cells having a low open current voltage (OCV) used in conjunction with an electrolyte that is stable at the cell operating potential slows or reduces impedance growth. This translates to greater cycle life, because the electrolyte is not being degraded as quickly with fast cycling. Excellent cycle life, including at high temperatures, is important for hybrid electric vehicle applications. In particular embodiments, the cell exhibiting low impedance growth has an open circuit voltage (OCV) at 100% state of charge (SOC) of the cathode that is less than about 3.8 V, for example, about 3.4V, as shown in FIGS. 2, 3 and 5.

In at least some embodiments, the cell exhibiting low impedance growth includes a cathode active material having an olivine structure and a formula $LiMPO_4$, where M is one or more transition metals, and the material is doped or undoped at the lithium site. Lithium iron phosphate has a low OCV that is less than about 3.8V. It is believed that lithium ion cells using positive electrode materials such as $LiFePO_4$ undergo less substantial volume change on charge and discharge than those using materials such as $LiCoO_2$, and therefore may exhibit somewhat less deterioration and corresponding impedance growth over long term cycling. Compared to conventional lithium-ion positive electrode materials, positive electrode materials such as $LiFePO_4$ described herein experience less mechanical stress over time, due to repeated intercalation and de-intercalation of lithium. In conventional battery electrode materials, the particles break apart, thus creating higher-impedance interfaces. Cells employing electrode materials as described herein do not suffer from this "electrochemical grinding" mechanism. However, it was unexpected that cells made with $LiFePO_4$ cathode materials could provide sufficiently low impedance growth for use in hybrid electric vehicle applications. Additional factors that may contribute to the low impedance growth exhibited by a cell as described herein include beneficial surface reactions at the cathode that decrease over time with use, or more complete infiltration of the cathode material by the electrolyte, which improves during use. In some embodiments, the cell exhibiting low impedance growth has an anode active material that includes a natural or synthetic graphite material.

Figure 4:
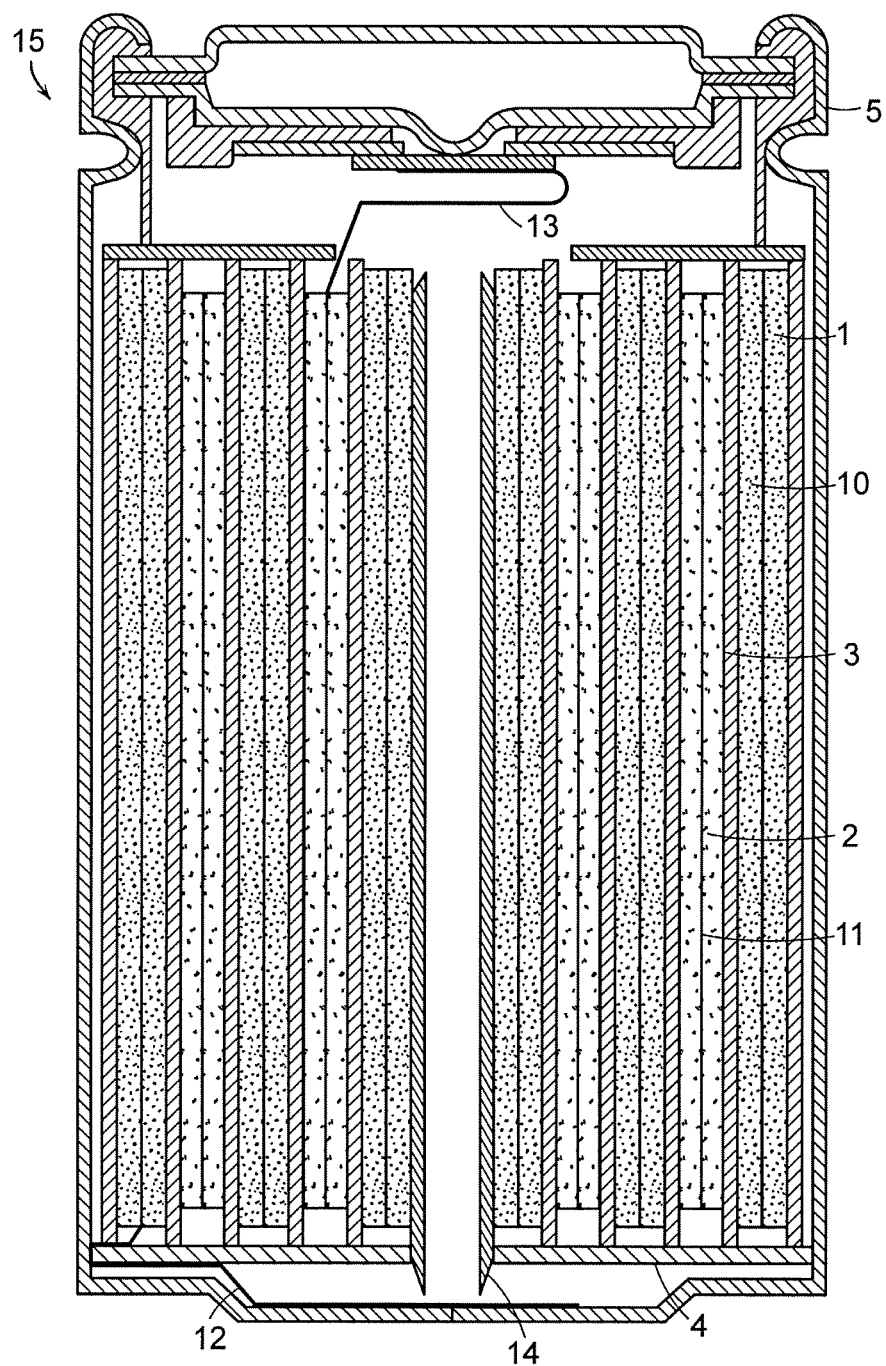
FIG. 4 is a cross-sectional view showing an exemplary lithium secondary cell having spirally wound electrodes.

In certain embodiments, the nonaqueous electrolyte secondary battery includes a battery element having an elongated cathode and an elongated anode, which are separated by two layers of an elongated microporous separator which are tightly wound together and placed in a battery can. A typical spiral electrode secondary cell is shown in FIG. 4 (reproduced from U.S. Pat. No. 6,277,522). The secondary cell 15 includes a double layer of anode material 1 coated onto both sides of an anode collector 10, a separator 2 and a double layer of cathode material 3 coated onto both sides of cathode collector 11 that have been stacked in this order and wound to make a spiral form. The spirally wound cell is inserted into a battery can 5 and insulating plates 4 are disposed at upper and lower surfaces of the spirally wound cell. A cathode lead 13 from anode collector 11 provides electrical contact with cover 7. An anode lead 12 is connected to the battery can 5. An electrolytic solution is added to the can.

A Li-ion battery capable of safe, long-term operation at a high rate of charge and discharge and low impedance growth, and a method of its manufacture includes one or more of the following features.

At the material level, the positive electrode includes a lithium-transition metal-phosphate compound as the electroactive material. The lithium-transition metal-phosphate compound may be optionally doped with a metal, metalloid, or halogen. In some embodiments, the positive electroactive material is an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material is a thermally stable, transition-metal-doped lithium transition metal phosphate having the olivine structure and having the formula $(Li_{1-x}Z_x)MPO_4$, or $Li(M_{1-x}Z_x)PO_4$ where M is one or more of V, Cr, Mn, Fe, Co, and Ni, and Z is a non-alkali metal dopant such as one or more of Ti, Zr, Nb, Al, Ta, W or Mg, and x ranges from 0.005 to 0.05. In a typical battery, the electroactive material is $(Li_{1-x}Z_x)MPO_4$, where Z is Zr, Nb or Ti.

Doped lithium iron phosphate compounds may be prepared from starting materials of lithium salts, iron compounds and phosphorus salts including, but not limited to, lithium carbonate, ammonium phosphate and iron oxalate, to which a low additional concentration of dopant metal such as Mg, Al, Ti, Fe, Mn, Zr, Nb, Ta and W have been added, typically as a metal oxide or metal alkoxide. The powder mixture is heated under a low oxygen environment at a temperature of 300° C. to 900° C. These compounds exhibit increased electronic conductivity at and near room temperature, which is particularly advantageous for their use as lithium storage materials. Further details regarding the composition and preparation of these compounds are found in United States Published Application 2004/0005265 (corresponding to U.S. patent application Ser. No. 10/329,046, entitled "Conductive Lithium Storage Electrode"), which is incorporated herein in its entirety by reference.

In some embodiments, the alkali transition metal phosphates include those described in U.S. patent application Ser.

No. 11/396,515, filed Apr. 3, 2006 entitled "Nanoscale Ion Storage Materials" which is incorporated herein in its entirety by reference. Examples include nanoscale ordered or partially disordered structures of the olivine ($A_xMPO_4$), NASICON ($A_x(M',M'')_2(PO_4)_3$), $VOPO_4$, $LiVPO_4F$, $LiFe(P_2O_7)$ or $Fe_4(P_2O_7)_3$ structure types, wherein A is an alkali ion, and M, M' and M'' are metals.

In one or more embodiments, the alkali transition metal phosphate composition has the formula $LiMPO_4$ (i.e., an olivine structure type), where M is one or more transition metals. In some embodiments, M is one or more of V, Cr, Mn, Fe, Co and Ni. In certain embodiments, the alkali transition metal phosphate composition is an ordered olivine ($Li_{1-x}MXO_4$), where M is at least one first row transition metal (e.g., one or more of V, Cr, Mn, Fe, Co and Ni), and x can range from zero to one, during lithium insertion and deinsertion reactions. In some embodiments, M is Fe. In the as-prepared state, x is typically about one. In particular embodiments, the special properties of the ion storage materials may be augmented by doping with foreign ions, such as metals or anions. Such materials are expected to exhibit similar behavior to that demonstrated herein for $Li_{1-x}FePO_4$ at the nanoscale, based on the scientific principles underlying such behavior. However, doping is not required for a material to exhibit special properties at the nanoscale.

In other embodiments, there is some substitution of Li onto the M-site. In one embodiment, there is about 5 or 10% substitution of Li onto the Fe site. The lithium transition metal phosphate material has an overall composition of $Li_{1-x-z}M_{1-z}PO_4$, where M comprises at least one first row transition metal selected from the group consisting of Ti, V, Cr, Mn, Fe, Co and Ni, where x is from 0 to 1 and z can be positive or negative. In some embodiments, M includes Fe, and z is between about 0.15 and −0.15. The material can exhibit a solid solution over a composition range of $0<x<0.30$, for example $0<x<0.15$. In some embodiments, the material exhibits a stable solid solution over a composition range of x between 0 and at least about 0.15. In some embodiments, the material exhibits a stable solid solution over a composition range of x between 0 and at least about 0.07 or between 0 and at least about 0.05 at room temperature (22-25° C.). The material can also exhibit a stable solid solution at low lithium content; e.g., where $1<x<0.8$ or where $1<x<0.9$, or where $1<x<0.95$.

In some embodiments, the positive electroactive material has a lithium-rich transition metal phosphate phase and a lithium-poor transition metal phosphate phase. For example, in some embodiments, the lithium-rich transition metal phosphate phase has the composition $Li_yMPO_4$ and the lithium-poor transition metal phosphate phase has the composition $Li_{1-x}MPO_4$, and $0.02<y<0.2$ and $0.02>x>0.3$ at room temperature (22-25° C.). In one or more embodiments, the material can exhibit a solid solution over a composition range of $0<x<0.15$ and $0.02<y<0.10$.

In some embodiments, the nanoscale positive electrode electroactive materials are also based on the alkali transition metal phosphates, such as those described in U.S. patent application Ser. No. 10/329,046. For example, in one embodiment, the electroactive material has an overall composition of $Li_xFe_{1-a}M''_aPO_4$, and a conductivity at 27° C., of at least about $10^{-8}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, in some cases, at least about $10^{-3}$ S/cm, and in other cases, at least about $10^{-2}$ S/cm.

In some embodiments, the alkali transition metal phosphate composition has an overall composition of $Li_xFe_{1-a}M''_aPO_y$, the compound having a gravimetric capacity of at least about 80 mAh/g while the device is charging/discharging at greater than about C rate. However, in some embodiments, the capacity is at least about 100 mAh/g, or in other embodiments, at least about 120 mAh/g, in some embodiments, at least about 150 mAh/g, and in still other embodiments, at least about 160 mAh/g. The present invention can, in some embodiments, also provide a capacity up to the theoretical gravimetric capacity of the compound.

In another embodiment, the alkali transition metal phosphate composition has an overall composition of $Li_{x-a}M''_a$-$FePO_4$.

In another embodiment, the alkali transition metal phosphate composition has an overall composition of $Li_{x-a}M''_a$-$FePO_4$, and a conductivity at 27° C. of at least about $10^{-8}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, and in some cases, at least about $10^{-3}$ S/cm, and in further cases, at least about $10^{-2}$ S/cm.

In another embodiment, the alkali transition metal phosphate composition has an overall composition of $Li_{x-a}M''_a$-$FePO_4$, the compound having a gravimetric capacity of at least about 80 mAh/g while the device is charging/discharging at greater than about C rate. However, in some embodiments, the capacity is at least about 100 mAh/g, or in other embodiments, at least about 120 mAh/g; in some embodiments, at least about 150 mAh/g and in still other embodiments, at least about 170 mAh/g. The present invention can, in some embodiments, also provide a capacity up to the theoretical gravimetric capacity of the compound.

According to one embodiment, a composition comprising a compound with a formula $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, has a conductivity at about 27° C. of at least about $10^{-8}$ S/cm, wherein A is at least one of an alkali metal and hydrogen, M' is a first-row transition metal, X is at least one of phosphorus, sulfur, arsenic, molybdenum and tungsten, M'' is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001<a≤0.1$, and x, y, and z have values such that x plus the quantity y(1-a) times a formal valence or valences of M', plus the quantity ya times a formal valence or valence of M'', is equal to z times a formal valence of the $XD_4$, $X_2D_7$, or $DXD_4$ group. x, y, and z are typically greater than 0. The conductivity of the compound can be at least about $10^{-5}$ S/cm, at least about $10^{-4}$ S/cm, and, in some cases, at least about $10^{-2}$ S/cm. In some embodiments, A is lithium and x/(x+y+z) can range from about zero to about one third, or about zero to about two thirds. In one embodiment, X is phosphorus, while in other embodiments, M' is iron. M'' can be any of aluminum, titanium, zirconium, niobium, tantalum, tungsten, or magnesium. M'' can be substantially in solid solution in the crystal structure of the compound. Typically, the compound has at least one of an olivine (e.g., $AMPO_4$), NASICON (e.g., $A_2M_2(PO_4)_3$), $VOPO_4$, $LiFe(P_2O_7)$ or $Fe_4(P_2O_7)_3$ structure, or mixtures thereof.

In some embodiments, the nanoscale electrode compound is $LiFePO_4$.

In some embodiments, M'' is at least partially in solid solution in the crystal structure of the compound at a concentration of at least 0.01 mole % relative to the concentration of M', the balance appearing as an additional phase, at least 0.02 mole % relative to the concentration of M', the balance appearing as an additional phase, and in yet other embodiments, at least 0.05 mole % relative to the concentration of M', the balance appearing as an additional phase and, in still other embodiments, at a concentration of at least 0.1 mole % relative to the concentration of M', the balance appearing as an additional phase.

In some cases, the alkali transition metal phosphate composition has an overall composition of $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)$, and has a conductivity at 27° C. of at least about $10^{-8}$ S/cm, wherein A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0002<a>0.1$, and x, y, and z have values such that $(1-a)_x$ plus the quantity ax times the formal valence or valences of M'' plus y times the formal valence or valences of M' is equal to z times the formal valence of the $XD_4$, $X_2D_7$ or $DXD_4$ group x, y, and z are typically greater than zero. The conductivity of the compound can be at least about $10^{-5}$ S/cm, at least about $10^{-4}$ S/cm, and, in some cases, at least about $10^{-2}$ S/cm. In some embodiments, A is lithium and $x/(x+y+z)$ can range from about zero to about one third. In one embodiment, X is phosphorus, while in other embodiments, M' is iron. M'' can be any of aluminum, titanium, zirconium, niobium, tantalum, tungsten, or magnesium. M'' can be substantially in solid solution in the crystal structure of the compound. Typically, the compound has at least one of an olivine, NASICON, $VOPO_4$, $LiFe(P_2O_7)$ or $Fe_4(P_2O_7)_3$ structure, or mixtures thereof. In some embodiments, the compound is $LiFePO_4$. In some embodiments, M'' is at least partially in solid solution in the crystal structure of the compound at a concentration of at least 0.01 mole % relative to the concentration of M', the balance appearing as an additional phase, at least 0.02 mole % relative to the concentration of M', the balance appearing as an additional phase, and in yet other embodiments, at least 0.05 mole % relative to the concentration of M', the balance appearing as an additional phase and, in still other embodiments, at a concentration of at least 0.1 mole % relative to the concentration of M', the balance appearing as an additional phase.

In some embodiments, the alkali transition metal phosphate composition has a suitable electronic conductivity greater than about $10^{-8}$ S/cm. The alkali transition metal phosphate composition can be a composition of $Li_x(M_{1-a}M''_a)PO_4$ or $L_{x-a}M''_aM'PO_4$, and can crystallize in the ordered-olivine or triphylite structure, or a structure related to the ordered olivine or triphylite structure with small displacements of atoms without substantial changes in the coordination number of anions around cations, or cations around anions. In such compounds $Li^+$ substantially occupies the octahedral site typically designated as M1, and a substantially divalent cation M' substantially occupies the octahedrally-coordinated site typically designated as M2, as described in the olivine structure given in "Crystal Chemistry of Silicate Minerals of Geophysical Interest," by J. J. Papike and M. Cameron, *Reviews of Geophysics and Space Physics*, Vol. 14, No. 1, pages 37-80, 1976. In some embodiments, the exchange of Li and the metal M' between their respective sites in a perfectly ordered olivine structure is allowed so that M' may occupy either site. M' is typically one or more of the first-row transition metals, V, Cr, Mn, Fe, Co, or Ni. M'' is typically a metal with formal valence greater than 1+ as an ion in the crystal structure.

In some embodiments, M', M'', x, and a are selected such that the electroactive material is a crystalline compound that has in solid solution charge compensating vacancy defects to preserve overall charge neutrality in the compound. In the compositions of type $Li_x(M_{1-a}M''_a)PO_4$ or $Li_{x-a}M''_aM'PO_4$, this condition can be achieved when a times the formal valence of M'' plus (1-a) times the formal valence of M' plus x is greater than 3+, necessitating an additional cation deficiency to maintain charge neutrality, such that the crystal composition is $Li_x(M'_{1-a-y}M''_a vac_y)PO_4$ or $Li_{x-a}M''_a M'_y vac_y PO_4$, where vac is a vacancy. In the language of defect chemistry, the dopant can be supervalent and can be added under conditions of temperature and oxygen activity that promote ionic compensation of the donor, resulting in nonstoichiometry. The vacancies can occupy either M1 or M2 sites. When x<1, the compound also has additional cation vacancies on the M1 site in a crystalline solid solution, said vacancies being compensated by increasing the oxidation state of M'' or M'. In order to increase the electronic conductivity usefully, a suitable concentration of said cation vacancies should be greater than or equal to $10^{18}$ per cubic centimeter.

In some cases, the alkali transition metal phosphate composition has an olivine structure and contains in crystalline solid solution, amongst the metals M' and M'', simultaneously the metal ions $Fe^{2+}$ and $Fe^{3+}$, $Mn^{2+}$ and $Mn^{3+}$, $Co^{2+}$ and $Co^{3+}$, $Ni^{2+}$ and $Ni^{3+}$, $V^{2+}$ and $V^{3+}$, or $Cr^{2+}$ and $Cr^{3+}$, with the ion of lesser concentration being at least 10 parts per million of the sum of the two ion concentrations.

In some embodiments, the alkali transition metal phosphate composition has an ordered olivine structure and A, M', M'', x, and a are selected such that there can be Li substituted onto M2 sites as an acceptor defect. In the compositions of type $Li_x(M'_{1-a}M''_a)PO_4$ or $Li_{x-a}M''_aM'PO_4$, typical corresponding crystal compositions are $Li_x(M'_{1-a-y}M''_aLi_y)PO_4$ or $Li_{x-a}M''_aM'_{1-y}Li_yPO_4$. In this instance, the subvalent Li substituted onto M2 sites for M' or M'' can act as an acceptor defect. In order to increase the electronic conductivity usefully, a suitable concentration of said Li on M2 sites should be greater than or equal to $10^{18}$ per cubic centimeter.

In some embodiments, the nanoscale electrode material is a p-type semiconducting composition, for example $Li_x(M'_{1-a}M''_a)PO_4$, $Li_xM''_aM'PO_4$, $Li_x(M'_{1-a-y}M''_a vac_y)PO_4$, $Li_{x-a}M''_aM'_{1-y}vac_yPO_4$, $Li_x(M'_{1-a-y}M''_aLi_y)PO_4$ or $Li_{x-a}M''_aM'_{1-y}Li_yPO_4$. M'' is a group IIA, IIIA, IVA, VA, VIA, VIIA, VIIIA, IB, IIB, IIIB, IVB, VB, and VIB element of the Periodic Table (catalog number S-18806, published by the Sargent-Welch company in 1994). Magnesium is an example of a dopant from Group IIA, Y is an example of a dopant from Group IIIA, Ti and Zr are examples of dopants from Group IVA, Nb and Ta are examples of dopants from Group VA, W is an example of a dopant from Group VIA, Fe is an example of a metal from Group VIIIA, and Al is an example of a dopant from Group IIIB.

In the alkali transition metal phosphate compositions described herein, x can have a value between zero and 1.1 in the initially prepared material. During its use as a lithium ion storage compound, x can vary between about zero and about 1.1. In the nanoscale materials described herein, a can have a value between about 0.0001 and 0.1. In some embodiments, out of the total amount a of M'', at least 0.0001 is in solid solution in the crystalline structure of the compound.

In some embodiments, M' is Fe and the solubility of M'' in the lattice can be improved if M'' has an ionic radius, in octahedral coordination, that is less than that of $Fe^{2+}$. Achieving solid solubility sufficient to increase the electronic conductivity above $10^{-8}$ S/cm can require that processing conditions (for example, temperature, atmosphere, starting materials) allow M'' to be stabilized in a particular valence state that would provide an ionic radius less than that of $Fe^{2+}$. In some cases, for example, when solid solubility is achieved, the M" ion may occupy the M1 site, or it may preferentially occupy the M2 site and cause $Fe^{2+}$ or $Fe^{3+}$, which would normally occupy the M2 site, to occupy the M1 site.

Generalizing the M" solubility requirement to other olivines of composition $Li_{x-a}M''_aM'PO_4$, M" typically has an ionic radius that is less than the average ionic radius of ions M' at the Li concentration x at which the compound is first synthesized.

Electrochemical insertion and removal can later change the valence distribution amongst the M' and M" ions. In some cases, M" can be in the desired valence state and concentration by adding, to the starting material, a salt of M" having the desired final valence. However, the desired valence distribution amongst metals M' and M" can be obtained by synthesizing or heat treating under appropriate conditions of temperature and gas atmosphere. For example, if M' is Fe, heat treatment should be conducted under temperature and atmosphere conditions that preserve a predominantly 2+ valence state, although some $Fe^{3+}$ is allowable and can even be beneficial for increasing conductivity.

In other cases, for example, for $Li_x(M_{1-a}M''_a)PO_4$ compositions, firing or heat treating at 600° C., can render the compositions conductive, even if M", or M', is a divalent cation, such as $Mg^{2+}$ or $Mn^{2+}$. In some cases, a $Li_3PO_4$ secondary phase can be present. Thus, the olivine composition according to some embodiments of the present invention may have a lithium deficiency that can result in a $Li_{x-a}M''_aM'PO_4$ crystal composition.

The possible dopants M" are not limited to those Groups of the Periodic Table that were previously identified, rather, M" can be any metal that satisfies the above requirements of size and valence. Specifically, for compositions $Li_{x-a}M'_aM''PO_4$, where M' is Fe, M" may be $Mg^{2+}$, $Mn^{2+}$, $Fe^{3+}$, $Al^{3+}$, $Ce^{3+}$, $Ti^{4+}$, $Zr^{4+}$, $Hf^{4+}$, $Nb^{5+}$, $Ta^{5+}$, $W^{4+}$, $W^{6+}$, or combinations thereof.

The lithium transition-metal phosphate compounds (e.g., doped or undoped $LiFeO_4$) can be prepared with a markedly smaller particle size and much larger specific surface area than previously known positive active materials, such as $LiCoO_2$, $LiNiO_2$ or $LiMn_2O_4$ and, thus improved transport properties. Improved transport properties reduce impedance and may contribute to low impedance growth. In some embodiments the positive active material consists of powder or particulates with a specific surface area of greater than about 10 $m^2/g$, or greater than about 15 $m^2/g$, or greater than about 20 $m^2/g$, or even greater than about 30 $m^2/g$. While methods are known to produce traditional positive active materials (e.g., $LiCoO_2$, $LiNiO_2$ or $LiMn_2O_4$) in the form of high specific surface area powders, Li-ion batteries made from such materials have inferior safety and stability characteristics due to a combination of the high oxidation potential and low inherent thermal stability of these conventional materials in their partially or fully delithiated form, such as that existing in a partially or fully charged Li-ion battery.

It has been found that $LiFeO_4$ having the olivine structure and made in the form of very small, high specific surface area particles is exceptionally stable in delithiated form even at elevated temperatures and in the presence of oxidizable organic solvents, e.g., electrolytes, thus enabling a safer Li-ion battery having a very high charge and discharge rate capability. In addition, the small-particle-size, high specific-surface-area $LiFePO_4$ material exhibits not only high thermal stability, low reactivity and high charge and discharge rate capability, but it also exhibits excellent retention of its lithium intercalation and deintercalation capacity during many hundreds, or even thousands, of high-rate cycles.

In certain embodiments, useful electrode materials include nanoscale ion storage materials, for example, nanoscale alkaline transition metal phosphates having the formula $LiMPO_4$, where M is one or more transition metals. In some embodiments, the nanoscale alkaline transition metal phosphate is doped at the Li site. In some embodiments, the nanoscale alkaline transition metal phosphate is doped at the M site. It has been unexpectedly discovered that these ion storage materials having sufficiently small size scale and correspondingly high surface to volume ratio or specific surface area provide fundamentally different physical properties compared to their conventional coarse-grained counterparts. Despite having gross structural similarities such as crystal structure type and basic atomic arrangements, the nanoscale materials are compositionally and structurally distinct from, and provide different and improved electrochemical utility and performance compared to, the coarse-grained materials. The difference in relevant physical properties arises because the nanoscale materials are sufficiently small in at least one dimension (for instance, the diameter of an equi-axed particle, the diameter of a nanorod, or the thickness of a thin film) that they have different defect and thermodynamic properties. These nanoscale ion storage materials exhibit outstanding electrochemical performance for use in primary or secondary storage batteries, in particular providing a very high rate capability, while providing a large fraction of the intrinsic charge capacity and energy density of the material. In certain embodiments, the nanoscale ion storage material has a BET (Brunauer-Emmett-Teller method) specific surface area of at least about 20 $m^2/g$, for example, at least about 25 $m^2/g$, at least about 30 $m^2/g$, at least about 35 $m^2/g$, at least about 40 $m^2/g$, at least about 45 $m^2/g$, or at least about 50 $m^2/g$. In some instances, the material includes approximately equi-axed particles having an "equivalent spherical particle size" (number-averaged mean particle diameter that would result in the measured surface area if the material were in the form of identically-sized spherical particles) of about 100 nm or less, for example, about 75 nm or less, about 70 nm or less, about 60 nm or less, about 50 nm or less, about 45 nm or less, about 40 nm or less, or about 35 nm or less. In certain embodiments, the material includes anisometric particles or a thin film or coating having a smallest cross-sectional dimension that is, on a number-averaged basis to provide a mean value, about 100 nm or less, for example, about 75 nm or less, about 70 nm or less, about 60 nm or less, about 50 nm or less, about 45 nm or less, about 40 nm or less, or about 35 nm or less. These dimensions can be measured using various methods, including direct measurement with an electron microscope of the transmission or secondary-electron type, or with atomic force microscopy. Such nanoscale ion storage materials are described in more detail in U.S. application Ser. No. 10/329, 046, supra.

In certain embodiments, the nanoscale electroactive materials described herein are prepared from conventional materials by size-reduction processes (e.g., milling) to reduce the particle dimensions into the desired range. However, this can be a highly energy-intensive process. Thus, the materials also can be synthesized in the nanoscale state, by methods including, but not limited to, solid-state reactions between metal salts, wet-chemical methods, such as co-precipitation, spray-pyrolysis, mechanochemical reactions, or combinations thereof. Nanoscale materials with the desired particle sizes and specific surface areas are obtained by using homogeneous reactants, minimizing the reaction or crystallization temperature (in order to avoid particle coarsening), and avoiding formation of liquid phases in which the product is highly soluble (which also tends to lead to particle coarsening). Specific processing conditions can typically be established for a given process without undue experimentation by those skilled in the art. Further details regarding the composition and preparation of these compounds are found in U.S. patent application Ser. No. 11/396,515, supra.

In some embodiments, nanoscale electroactive materials are prepared by non-equilibrium, moderate temperature techniques, such as wet-chemical or low temperature solid-state reactions or thermochemical methods. The materials thus prepared can acquire properties such as increased nonstoichiometry and disorder and increased solubility for dopants because they are synthesized in a metastable state or because kinetic pathways to the final product differ from those in conventional high temperature processes. Such disorder in the nanoscale form can also be preserved substantially under electrochemical use conditions and provide benefits as described herein.

On an electrode level, the active material and a conductive additive are combined to provide an electrode layer that permits rapid lithium diffusion throughout the layer. A conductive additive such as carbon or a metallic phase is included in order to improve its electrochemical stability, reversible storage capacity, or rate capability. Exemplary conductive additives include graphite, carbon black, acetylene black, vapor grown fiber carbon ("VGCF") and fullerenic carbon nanotubes. Conductive diluents are present in a range of about 1%-5% by weight of the total solid composition of the positive electrode.

The positive electrode (cathode) is manufactured by applying a semi-liquid paste containing the cathode active compound and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. Exemplary adhesion layers include, without limitation, those described in U.S. patent application Ser. No. 11/515,633, entitled "Nanocomposite Electrodes and Related Devices," filed Sep. 5, 2006, which is incorporated herein in its entirety by reference. The dried layers are calendared to provide layers of uniform thickness and density. The binder used in the electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

The positive electrode containing the positive electroactive material has a specific surface area of the electrode measured using the nitrogen adsorption Brunauer-Emmett-Teller (BET) method after the densification or calendaring step that is greater than 10 m$^2$/g or greater than 20 m$^2$/g. A positive electrode can have a thickness of less than 125 µm, e.g., between about 50 µm to 125 µm, or between about 80 µm to 100 µm on each side of the current collector, and a pore volume fraction between about 40 and 70 vol. %. The active material is typically loaded at about 10-20 mg/cm$^2$, and typically about 11-15 mg/cm$^2$. In general, a thicker electrode layer (and higher active material loading) provides greater total capacity for the battery. However, thicker layers also increase the electrode impedance. The present inventors have surprisingly discovered that high capacity, thick layers may be used in a low impedance (high rate) cell. Use of a high specific surface area active material, while maintaining adequate pore volume, provides the desired capacity without increasing impedance to unacceptably high levels.

In another embodiment of the present invention, the electroactive material of the positive electrode includes a material that, while of high electronic conductivity, does not vary its conductivity by more than a factor of five, or factor of two, over the entire charge cycle. This feature of the Li-ion cell is contrasted with conventional electroactive positive electrode materials such as $LiCoO_2$, $LiNiO_2$ or $LiMn_2O_4$ for which conductivity increases dramatically once delithiation during charging occurs. The dramatic increase in conductivity of the electroactive material of the positive electrode contributes to a decrease in impedance. In contrast, an electroactive material of the present cells exhibit only moderate increases in conductivity, so that its contribution to impedance is more moderate.

The selection criteria for an anode are at two levels, the particle level and the electrode level. At the particle level, the particle size and the Li diffusion coefficient of the particle are selection criteria. In one embodiment, the negative active material is a carbonaceous material. The carbonaceous material may be non-graphitic or graphitic. A small-particle-size, graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used. The carbonaceous material has a numerical particle size (measured by a laser scattering method) that is smaller than about 25 µm, or smaller than about 15 µm, or smaller than about 10 µm, or even less than or equal to about 6 µm. The smaller particle size reduces lithium diffusion distances and increases rate capability of the anode, which is a factor in preventing lithium plating at the anode. In those instances where the particle is not spherical, the length scale parallel to the direction of lithium diffusion is the figure of merit. Larger particle sized materials may be used if the lithium diffusion coefficient is high. The diffusion coefficient of MCMB is ~$10^{-10}$ cm$^2$/s. Artificial graphite has a diffusion coefficient of ~$10^{-8}$ cm$^2$/s. As a result larger particle size artificial graphite could be used, approximately equal to 15 microns times the square root of the ratio of the respective diffusivities (H. Yang et al., *Journal of Electrochemical Society*, 151 (8) A1247-A1250 (2004)).

In some embodiments, the negative active material consists of powder or particulates with a specific surface area measured using the nitrogen adsorption Brunauer-Emmett-Teller (BET) method to be greater than about 2 m$^2$/g, or 4 m$^2$/g, or even about 6 m$^2$/g.

On an electrode level, the active material and a conductive additive are combined to provide an electrode layer that permits rapid lithium diffusion throughout the layer. A conductive additive such as carbon or a metallic phase may also be included in the negative electrode. Exemplary conductive additives include graphite, carbon black, acetylene black, vapor grown fiber carbon ("VGCF") and fullerenic carbon nanotubes. Conductive diluents are present in a range of about 0%-5% by weight of the total solid composition of the negative electrode.

The negative electrode (anode) of the battery is manufactured by preparing a paste containing the negative active material, such as graphitic or non-graphitic carbon, and a conductive carbon additive homogeneously suspended in a solution of a polymer binder in a suitable casting solvent. The paste is applied as a uniform-thickness layer to a current collector and the casting solvent is removed by drying. A metallic substrate such as copper foil or grid is used as the negative current collector. To improve the adhesion of the active material to the collector, an adhesion promoter, e.g., oxalic acid, may be added to the slurry before casting. The binder used in the negative electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

At the electrode level, the negative electrode can have a thickness of less than about 75 μm, e.g., between about 20 μm to about 65 μm, or between about 40 μm to about 55 μm on both sides of the current collector, and a pore volume fraction between about 20 and about 40 vol. %. The active material is typically loaded at about 5-20 mg/cm$^2$, or about 4-5 mg/cm$^2$. In general, a thicker electrode layer (and higher active material loading) provides greater total capacity for the battery. However, thicker layers also increase the electrode impedance by reducing the ease of lithium diffusion into the anode. The present inventors have surprisingly discovered that high capacity, thick layers may be used in a low impedance cell through selection of active materials as indicated above and maintaining adequate pore volume.

A nonaqueous electrolyte is used and includes an appropriate lithium salt, such as, for example, $LiPF_6$, $LiBF_4$, $LiAsF_6$, or lithium bis(trifluoromethylsulfonimide) (LiTFMSI), lithium bis(oxalatoborate) (LiBOB), or lithium bis(pentafluoroethylsulfonyl)imide (LiBETI) dissolved in a nonaqueous solvent. One or more functional additives, such as, for example, $CO_2$, vinylene carbonate, ethylene sulfite, ethylene thiocarbonate, dimethyl dicarbonate, spirodicarbonate and propane sultone, can be included to modify the solid-electrolyte interface/interphase (SEI) that forms on the electrodes, particularly negative carbon electrodes. The electrolyte may be infused into a porous separator that spaces apart the positive and negative electrodes. In one or more embodiments, a microporous electronically insulating separator is used.

Numerous organic solvents have been proposed as the components of Li-ion battery electrolytes, notably a family of cyclic carbonate esters such as ethylene carbonate (EC), propylene carbonate (PC), butylene carbonate (BC), and vinylene carbonate (VC), and their chlorinated or fluorinated derivatives, and a family of acyclic dialkyl carbonate esters, such as dimethyl carbonate (DMC), diethyl carbonate (DEC), ethylmethyl carbonate (EMC), dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include methyl acetate (MA), ethyl acetate (EA), methyl formate (MF), propyl acetate (PA), methyl butyrate (MB), ethyl butyrate (EB), γ-butyrolactone (γ-BL), dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures.

In certain embodiments, a cell exhibiting low impedance growth employs an electrolyte having the following composition: about 0.8 M to about 1.5 M $LiPF_6$ in an organic solvent made up of about 30 wt % to about 70 wt % ethylene carbonate, about 0 wt % to about 20 wt % propylene carbonate, about 0 wt % to about 60 wt % dimethyl carbonate, about 0 wt % to about 60 wt % ethyl methyl carbonate, about 0 wt % to about 60 wt % diethyl carbonate, and about 0 wt % to about 5 wt % vinylene carbonate. The sum of the weight percents of ethylene carbonate and propylene carbonate is between about 30 wt % and about 70 wt % of the total organic solvent, and propylene carbonate represents about 30 wt % or less of this sum. In particular embodiments, the cell exhibiting low impedance growth and employing this electrolyte composition includes a cathode active material having an olivine structure and a formula $LiMPO_4$, where M is one or more transition metals, and the material is doped or undoped at the lithium or M site. In at least some instances, the cell includes a carbonaceous anode active material, for example, a graphitic material such as mesocarbon microbeads (MCMB).

In some embodiments, a cell exhibiting low impedance growth employs an electrolyte having the following composition: about 0.8 M to about 1.5 M $LiPF_6$ in an organic solvent made up of about 30 wt % to about 70 wt % ethylene carbonate, about 0 wt % to about 20 wt % propylene carbonate, about 0 wt % to about 60 wt % dimethyl carbonate, and about 0 wt % to about 60 wt % ethyl methyl carbonate. The sum of the weight percents of ethylene carbonate and propylene carbonate is between about 30 wt % and about 70 wt % of the total organic solvent, and propylene carbonate represents about 30 wt % or less of this sum. In particular embodiments, the cell exhibiting low impedance growth and employing this electrolyte composition includes a cathode material having an olivine structure and a formula $LiMPO_4$, where M is one or more transition metals, and the material is doped or undoped at the lithium or M site. In at least some instances, the cell includes a carbonaceous anode material, for example, a graphitic material such as mesocarbon microbeads (MCMB).

In certain embodiments, a cell exhibiting low impedance growth employs an electrolyte having the following composition: about 0.8 M to about 1.5 M $LiPF_6$ in an organic solvent made up of about 30 wt % to about 70 wt % ethylene carbonate, about 0 wt % to about 20 wt % propylene carbonate, and about 0 wt % to about 70 wt % dimethyl carbonate and/or diethyl carbonate and/or ethyl methyl carbonate. The sum of the weight percents of ethylene carbonate and propylene carbonate is between about 30 wt % and about 70 wt % of the total organic solvent, and propylene carbonate represents about 30 wt % or less of this sum. In particular embodiments, the cell exhibiting low impedance growth and employing this electrolyte composition includes a cathode material having an olivine structure and a formula $LiMPO_4$, where M is one or more transition metals, and the material is doped or undoped at the lithium or M site. In at least some instances, the cell includes a carbonaceous anode material, for example, a graphitic material such as mesocarbon microbeads (MCMB).

In certain embodiments, a cell exhibiting low impedance growth employs an electrolyte having the following composition: about 1.0 M to about 1.3 M $LiPF_6$ in an organic solvent made up of about 30 wt % to about 50 wt % ethylene carbonate, about 10 wt % to about 20 wt % propylene carbonate, about 20 wt % to about 35 wt % dimethyl carbonate, about 20 wt % to about 30 wt % ethyl methyl carbonate, and about 1 wt % to about 3 wt % vinylene carbonate. In particular embodiments, the cell exhibiting low impedance growth and employing this electrolyte composition includes a cathode material having an olivine structure and a formula $LiMPO_4$, where M is one or more transition metals, and the material is doped or undoped at the lithium or M site. In at least some instances, the cell includes a carbonaceous anode material, for example, a graphitic material such as mesocarbon microbeads (MCMB).

It was unexpected that electrolyte formulations as described herein, used in combination with the electrode-active materials and cell constructions as described herein, would provide such low impedance growth.

A solid or gel electrolyte may also be employed. The electrolyte may be an inorganic solid electrolyte, e.g., LiN or LiI, or a high molecular weight solid electrolyte, such as a gel, provided that the materials exhibits lithium conductivity. Exemplary high molecular weight compounds include poly (ethylene oxide), poly(methacrylate) ester based compounds, or an acrylate-based polymer, and the like.

As the lithium salt, at least one compound from among $LiClO_4$, $LiPF_6$, $LiBF_4$, $LiSO_3CF_3$, $LiN(SO_2CF_3)_2$, $LiN(SO_2CF_2CF_3)_2$ $LiAsF_6$, lithium bis(trifluoromethylsulfonimide) (LiTFMSI), lithium bis(oxalatoborate) (LiBOB), lithium bis(pentafluoroethylsulfonyl)imide (LiBETI) and the like are used. In some embodiments, the lithium salt is at a concentration from about 0.5 to about 1.5 M, for example, in certain embodiments from about 1.0 to about 1.3 M.

In certain embodiments, the above described positive electrode is brought into intimate contact with the negative electrode through the separator layers, which are then spirally wound a number of times around a small-diameter mandrel to form the jelly-roll electrode-separator assembly. Next, the jelly-roll structure is inserted into a battery can, for example, made of nickel-plated steel or aluminum, current collector tabs are spot-welded to the battery can and can header, which is preferably equipped with a variety of safety features, such as positive-temperature coefficient elements, pressure burst disks, etc. Alternatively, uncoated regions can be created along the edge of the electrode, thereby exposing bare metal foil. One or preferably more metal foil strips or tabs, between about 0.4 cm and about 0.8 cm wide, can be attached to these bare regions using an ultrasonic welder. These tabs can then be attached to the can or header using an ultrasonic or spot (resistance) welder. The nonaqueous electrolyte, for example, including a solution of a lithium salt in a mixture of carbonate esters, is injected into the battery can, the can header is sealed to the battery can using a crimp seal or laser weld. An alternative cell design is described in U.S. application Ser. No. 11/515,597, filed on Sep. 5, 2006, entitled "Battery Cell Design and Method of Its Construction," which is incorporated in its entirety by reference herein.

According to one or more embodiments, a Li-ion battery contains an optionally doped lithium transition metal phosphate positive electrode, a highly microporous electronically insulating separator layer, a graphitized-carbon negative electrode, and a multicomponent liquid organic electrolyte solution in which a lithium salt is dissolved at a concentration from about 0.5 to about 1.5 M. Both the positive and negative electrodes have high surface area and high pore volume. In order to reduce the chance of lithium plating at the anode, the lithium capacity of the negative electrode is higher than that of the positive electrode. The battery is capable of being charged and discharged at a very high rate, due to having the above described relative electrode resistances, which is accomplished by the selection of appropriate active materials, e.g., composition, particle size, porosity, surface area, pore volume, etc., and by the addition of appropriate amounts of conductive diluents such as carbon to the positive or negative electrode. The types, amounts, and methods of adding such conductive diluents are readily determined by methods well-known to those skilled in the art.

Cells prepared as described herein (e.g, with a doped LiFePO4 cathode and electrolyte compositions that contained a mixture of cyclic and acyclic carbonates, lithium salts, and optional linear esters) demonstrated low impedance growth with up to 600 cycles (5A charge/discharge, room temperature. In particular, the DC resistance for each cell was relatively constant over 600 cycles (approximately ±20% from initial), exhibiting no trend in either the increasing or decreasing direction. These data confirm the excellent stability of the cells described herein over long battery life.

Although the particular embodiment of a Li-ion battery described here relates to a cylindrical cell, it is to be understood that the present invention is not limited to such a battery shape. In fact, other can shapes and sizes, such as square, rectangular (prismatic) coin, button or the like may be used.

Further, although the above description uses an example of a liquid type nonaqueous electrolyte Li-ion battery, it is to be understood that other types of non-aqueous electrolytes, such as those of gel or solid polymer type can be used to manufacture thin batteries of this invention, whose electrodes may be bonded to their respective separators and packaged in thin metal-polymer laminate film bags as an outer casing material.

EXAMPLES

Example 1

Preparation of Lithium-Ion Secondary Cells

To prepare doped $LiFePO_4$, iron oxalate, lithium carbonate, ammonium dihydrogen phosphate and zirconium ethoxide are mixed in a 2:1:2:0.02 molar ratio in a plastic milling jar containing grinding media and acetone for 72 hours. Heating and stirring the slurry to the boiling point of acetone removed the acetone. The dried powder is heated under an inert atmosphere at 1° C. per minute to 350° C. and held there for 10 hours, followed by ramping at 5 degrees per minute to 600° C. and holding there for 20 hours. The finished product is milled and then stored in the absence of water.

The positive electrode slurry is prepared by dissolving 7 g of PVDF-HFP copolymer commercially available as Kynar® 2801 from AtoFina in 250 g of NMP and dispersing in the resulting solution a dry mixture of 88 g of doped $LiFeO_4$ prepared as described above and 5 g of conductive carbon (Super P or Ensaco). The paste is homogenized in a planetary mixer or blender, cast on both sides of an aluminum foil current collector using a die casting apparatus, dried in an oven to remove the casting solvent and densified using a calendering apparatus. The electrode mass thus prepared was carefully scraped from the current collector foil and its porosity determined to be 53-57 vol.-%. Its specific surface area determined by the BET method was 22-25 $m^2/g$. The two-sided thickness of the calendered positive electrode, including current collector foil, was approximately 200 µm. The positive electrode had an areal capacity of approximately 1.6 $mAh/cm^2$.

The negative electrode was prepared by dissolving 8 g of PVDF-HFP copolymer described above in 250 ml of NMP, adding to it a mixture of 88 g of mesophase microbead synthetic graphitic carbon MCMB 6-28 (Osaka Gas Co., Ltd.) and 4 g of conductive carbon (Super P). The paste was homogenized in a planetary mixer or blender, cast on both sides of a copper current collector foil using a die casting apparatus, dried in an oven and densified using a calendering apparatus. The negative electrode porosity was determined to be 29-33 vol.-%. The two-sided thickness of the calendered negative electrode, including current collector foil, was approximately 90 μm. The negative electrode had an areal capacity of approximately 1.7 mAh/cm$^2$.

Electrolyte solutions were prepared as described below.

In one exemplary electrolyte composition, ethylene carbonate and diethyl carbonate were combined in a 40:60 weight ratio in 1.0 M LiPF$_6$ salt.

In a second exemplary electrolyte composition, ethylene carbonate and ethylmethyl carbonate were combined in a 30:70 weight ratio in 1.0 M LiPF$_6$ salt.

In a third exemplary electrolyte composition, ethylene carbonate, ethylmethyl carbonate and methyl butyrate were combined in a 30:30:40 weight ratio in 1.4 M LiPF$_6$ salt.

In a fourth exemplary electrolyte composition, ethylene carbonate, propylene carbonate, ethylmethyl carbonate and dimethyl carbonate were combined in a 40:10:30:20 weight ratio in 1.3 M LiPF$_6$ salt. Two percent (by weight) vinylene carbonate was added to the composition.

In a fifth exemplary electrolyte composition, ethylene carbonate, dimethyl carbonate, and ethylmethyl carbonate were combined in a 30:20:50 weight ratio in 1.2 M LiPF$_6$ salt.

In a sixth exemplary electrolyte composition, ethylene carbonate, propylene carbonate, ethylmethyl carbonate, and dimethyl carbonate were combined in a 40:10:30:20 weight ratio in a combination of 1.3 M LiPF$_6$ salt and 0.1 M lithium bis(oxalatoborate) (LiBOB) salt. Two percent (by weight) vinylene carbonate was added to the composition.

In a seventh exemplary electrolyte composition, ethylene carbonate, propylene carbonate, ethylmethyl carbonate, and dimethyl carbonate were combined in a 40:10:30:20 weight ratio in 1.3 M LiPF$_6$ salt.

To assemble the cells, both electrodes were cut to proper dimensions, interposed with a slightly larger elongated pieces of a microporous polyolefin separator Celgard® 2500 (Celgard LLC), assembled into an 18650-size cylindrical cell by a method well-understood by those skilled in the art and activated one of the cyclic and acyclic carbonate ester mixtures above.

Total Cell Areal Specific Impedance Measurement.

Area specific impedance (ASI) is the impedance of a device normalized with respect to surface area and is defined as the impedance measured at 1 kHz (Ω), using an LCZ meter or frequency response analyzer, multiplied by the surface area of opposing electrodes (cm$^2$). This measurement was performed by applying a small (5 mV) sinusoidal voltage to the cell and measuring the resulting current response. The resulting response can be described by in-phase and out-of-phase components. The in-phase (real or resistive) component of the impedance at 1 kHz is then multiplied by the surface area of opposing electrodes (cm$^2$) to give the area specific impedance. The area specific impedance of a cell as described above was 15 Ω-cm$^2$.

Example 2

Preparation of a Li-Ion Cell

A positive electrode was prepared as described in Example 1, the only exception being that acetone was used instead of NMP as a casting solvent to prepare a positive electrode paste. A cylindrical Li-ion battery was assembled following the steps and procedures described in Example 1. The positive electrode material removed from the current collector foil after calendering had a porosity of 27 vol.-% and specific surface area of 13 m$^2$/g.

Example 3

Preparation of a Li-Ion Cell

A positive electrode was prepared as described in Example 1, the only exception being that an acetone-NMP mixture in the volumetric ratio of 90 to 1 was used instead of pure NMP as a casting solvent to prepare a positive electrode paste. A cylindrical Li-ion battery was assembled following the steps and procedures described in Example 1.

Example 4

Preparation of a Li-Ion Cell

A negative carbon-based electrode was prepared following the procedure described in Example 1, the only exception being that a larger-particle-size mesophase microbead graphitic-type carbon, MCMB 10-28 (Osaka Gas Co., Ltd.) was used instead of MCMB 6-28. A cylindrical Li-ion battery was then assembled following the steps and procedures described in Example 1.

Example 5

Negative Electrode Area Specific Impedance Measurement

Pouch-type test cells were assembled using rectangular electrode pieces punched out of the positive and negative electrodes described in Example 1, with the following exceptions: (1) an acetone-NMP mixture in the volumetric ratio of 90 to 10 was used, instead of pure NMP as a casting solvent to prepare a positive electrode paste; (2) Celgard E903, rather than Celgard 2500, microporous separator was used; and (3) 1.0 M solution of LiPF6 in a mixture of cyclic and acyclic carbonate esters was used as the electrolyte.

After the electrodes were punched to the correct size and shape, a portion of each electrode was removed to reveal bare metal foil. This bare metal foil region was approximately two inches long and 0.5 inches wide and served as a tab for current collection. A piece of separator was placed between the two electrodes. Then, another small piece of separator was used to electrically insulate a small piece of lithium placed on the edge of a strip of copper foil. This lithium reference electrode was placed between the two previously mentioned electrodes, near the outside edge. The entire assembly was then placed in a thin, metal-polymer laminate film sealed on three sides to create a pouch or bag as an outer casing material. Sufficient electrolyte was added to fully wet the separator and the bag was sealed across the bare metal foil tabs, using an impulse sealer. The pouch cell was placed between two rigid plates, which were then clamped together using binder clips.

The area specific impedance of each electrode was measured independently, according to the method described in Example 1. In the case of a three electrode cell, the contribution of the anode and cathode impedance to the overall cell impedance can be separated. Measurement of the reference electrode cell showed that the negative electrode area specific impedance was less than 2 Ω-cm$^2$.

Example 6

Charge/Discharge Cycling of Li-Ion Cell at Different C-Rates

A reference electrode pouch cell was fabricated following the procedure described in Example 5.

The cell was initially charged by the galvanostatic (constant current) method to 3.8 V using progressively higher C-rates (2, 5, 10, and 20C.) After each charge, a potentiostatic segment was applied until the current decreased to a C/20 rate (CC-CV protocol or taper charge method). The potentials of the positive and negative electrodes were recorded independently using the lithium reference electrode, which are shown in FIG. 5. In FIG. 5, the positive electrode (cathode) potential is represented by a dashed line at the top of the figure and the negative electrode (anode) potential is represented by a heavy line in the lower portion of the figure. The potential of the anode remains above 0 V (the plating potential of lithium metal) even at charge rates of 20 C. The charging cycle at 10C and 20C is extremely fast. State of charge is achieved at very short charge durations, e.g., about 6 minutes at 10C, with low levels of cell heating. This can be compared to a low charge rate of 1C, requiring 60 minutes for state of charge.

The figure demonstrates that the cell can be charged at rates up to 20 C without plating of lithium at the negative electrode. The positive electrode polarization (as indicated by the horizontal arrows in the figure) is much larger than the negative electrode polarization, indicating that a majority of the impedance in the system occurs at the positive electrode, thus preventing the negative electrode from reaching the lithium plating potential.

Example 7

Cycle Life of a Li-Ion Cell at 10C

An 18650-type cylindrical cell was assembled using positive and negative electrodes as described in Example 1, with the only exception being that an acetone-NMP mixture in the volumetric ratio of 90 to 10 was used, instead of pure NMP as a casting solvent, to prepare a positive electrode paste. The 18650 cylindrical Li-ion battery was assembled following the steps and procedures described in Example 1.

Figure 6:
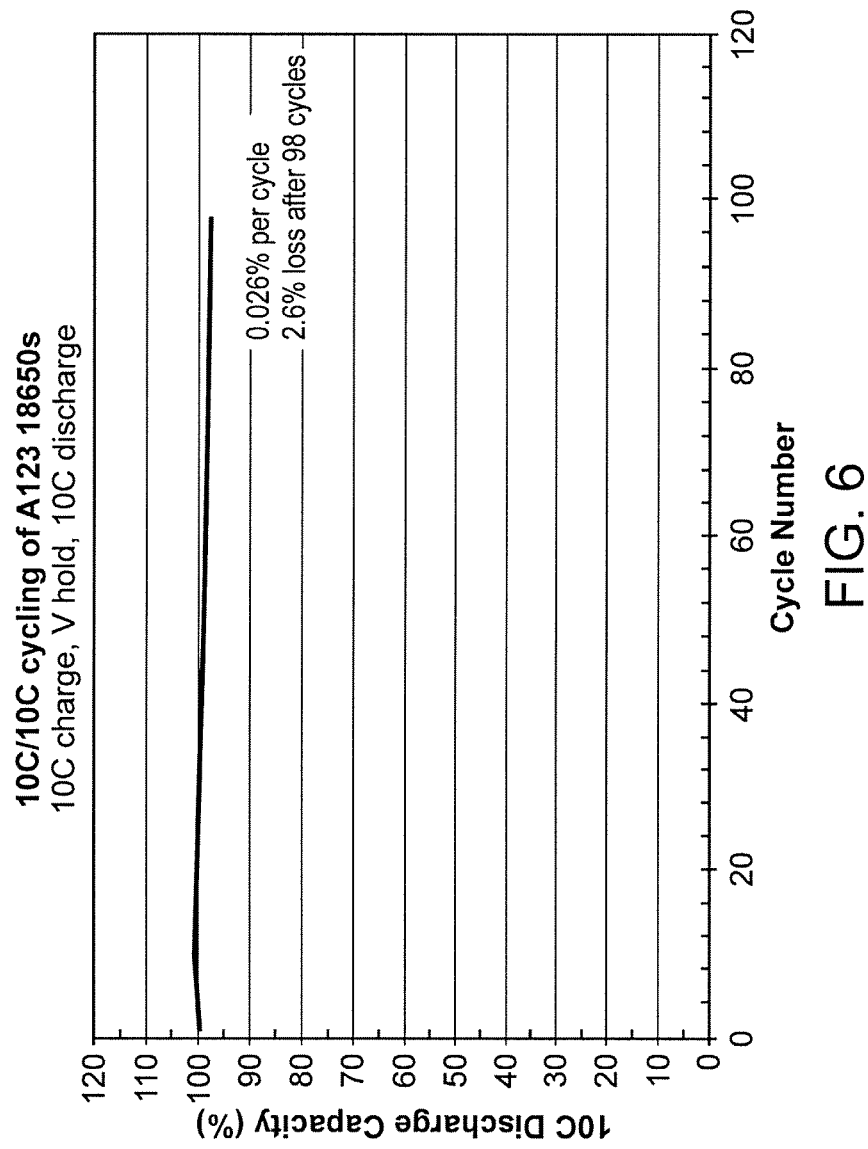
FIG. 6 shows the charge and discharge voltage and capacity of a test cell constructed according to one or more embodiments of the present invention during extended cycling at a 10C charge and 10C discharge rate.

The cell was charged by the galvanostatic (constant current) method to 3.8 V at a 10C rate and followed by a potentiostatic segment until the current decreased to a C/20 rate (CC-CV protocol or taper charge method). The cell was then discharged at 10C, allowed to rest for 30 minutes, then charged again. The data was normalized to the 10C capacity during the first discharge. FIG. 6 is a plot of discharge capacity vs. cycle number for the cell, demonstrating only a 2.6% capacity loss over 98 cycles. This represents a capacity fade of only 0.026% per cycle.

Comparative Example 1

For comparison purposes, a number of contemporary commercial Li-ion cells made by several leading manufacturers were recovered from their multi-cell battery packs and subjected to several slow (C/5) charge-discharge cycles between 4.2 and 2.8 V followed by a series of single discharges at discharge rates from C/2 to 4C. The best performing cell type (an 800 mAh prismatic cell based on the $LiCoO_2$-graphite couple which showed very low capacity fade during slow cycling and the highest rate capability (84% capacity retention at a 4C rate)) was selected for further comparative testing.

Figure 7:
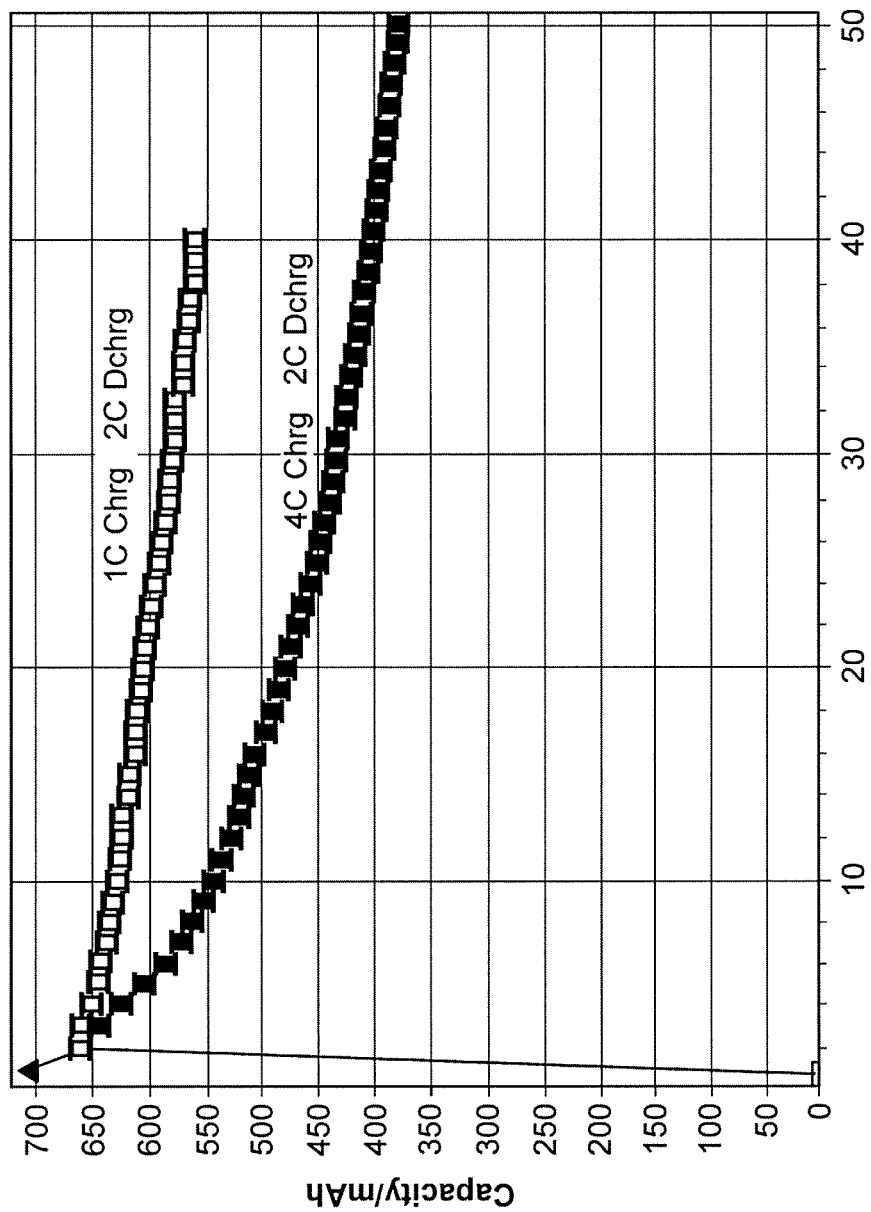
FIG. 7 is a plot of capacity vs. cycle number at different charge/discharge rates for a commercially available comparative lithium-ion battery.

The cell was cycled at a 1C rate of charge and a 2C rate of discharge between 2.8 and 4.2 V. The cell capacity (measured in units of mA-h) decreased from approximately 660 mA-h to 560 mA-h over 40 cycles, which represents a total decrease in capacity of 15.2% total and a loss in capacity of 0.38% per cycle. A similar cell that was cycled at a 4C charge rate and a 2C discharge rate exhibited even poorer capacity fade performance. After 50 cycles, the cell exhibited a 42.4% loss of capacity, representing 0.85% capacity loss per cycle. Life cycle performance of these comparative lithium-ion cells is shown in FIG. 7.

Example 8

Impedance Change with Cycling

Impedance change upon cycling, i.e., impedance growth, was measured for a cell as described in the above Examples. The cell tested was a cylindrical cell 26 mm in diameter and 65 mm in height. The cathode was Nb-doped $LiFePO_4$. The anode was a graphite powder (mesocarbon microbeads) with vapor grown carbon fiber (VGCF) and a binder (Kureha, Japan). The electrolyte composition contained $LiPF_6$ salt in a mixture of ethylene carbonate (EC), propylene carbonate (PC), dimethyl carbonate (DMC), and ethyl methyl carbonate (EMC), with vinylene carbonate (VC) added according to one of the compositions described in Example 1.

The cell was cycled from 0 to 100% depth of discharge at 3A/5A charge/discharge current. The results were calculated from a 1 second, 5A pulse. Specifically, the cell was charged at 3A to 3.6V with a constant voltage (CV) hold until the current decayed to less than 40 mA. Then, the cell was discharged at 5A to 2V. The cell's DC resistance was measured periodically by discharging it to 90% state of charge (SOC), leaving it at rest fro 30 minutes and applying a 5A pulse for one second. The difference in voltage, $\Delta V = V_{end} - V_{ini}$, where $V_{end}$ was the cell voltage at the end of the 1 sec pulse and $V_{ini}$ was the OCV of the cell, was divided by the current to give the resistance ($DCR = \Delta V/i$). The results, shown in FIG. 8, demonstrate that impedance decreased with cycling at 25° C. and 45° C., and increased slightly with cycling at 60° C.

Example 9

Hybrid Pulse Power Characterization

A hybrid pulse power characterization (HPPC) test, as described in U.S. Department of Energy, *FreedomCAR Battery Test Manual for Power-Assist Hybrid Electric Vehicles* (October, 2003), was performed on a cell as described in Example 8. The HPPC test provides a measurement of dynamic power capability over a cell's useable charge and voltage range. The test profile includes both discharge and regenerative pulses. The test establishes the minimum cell voltage discharge power capability at the end of a 10 second discharge current pulse, and the maximum cell voltage regenerative power capability at the end of a 10 second regenerative current pulse, both as a function of depth of discharge. Other performance characteristics, such as available energy and available power, can be determined from the power capabilities.

Figure 9:
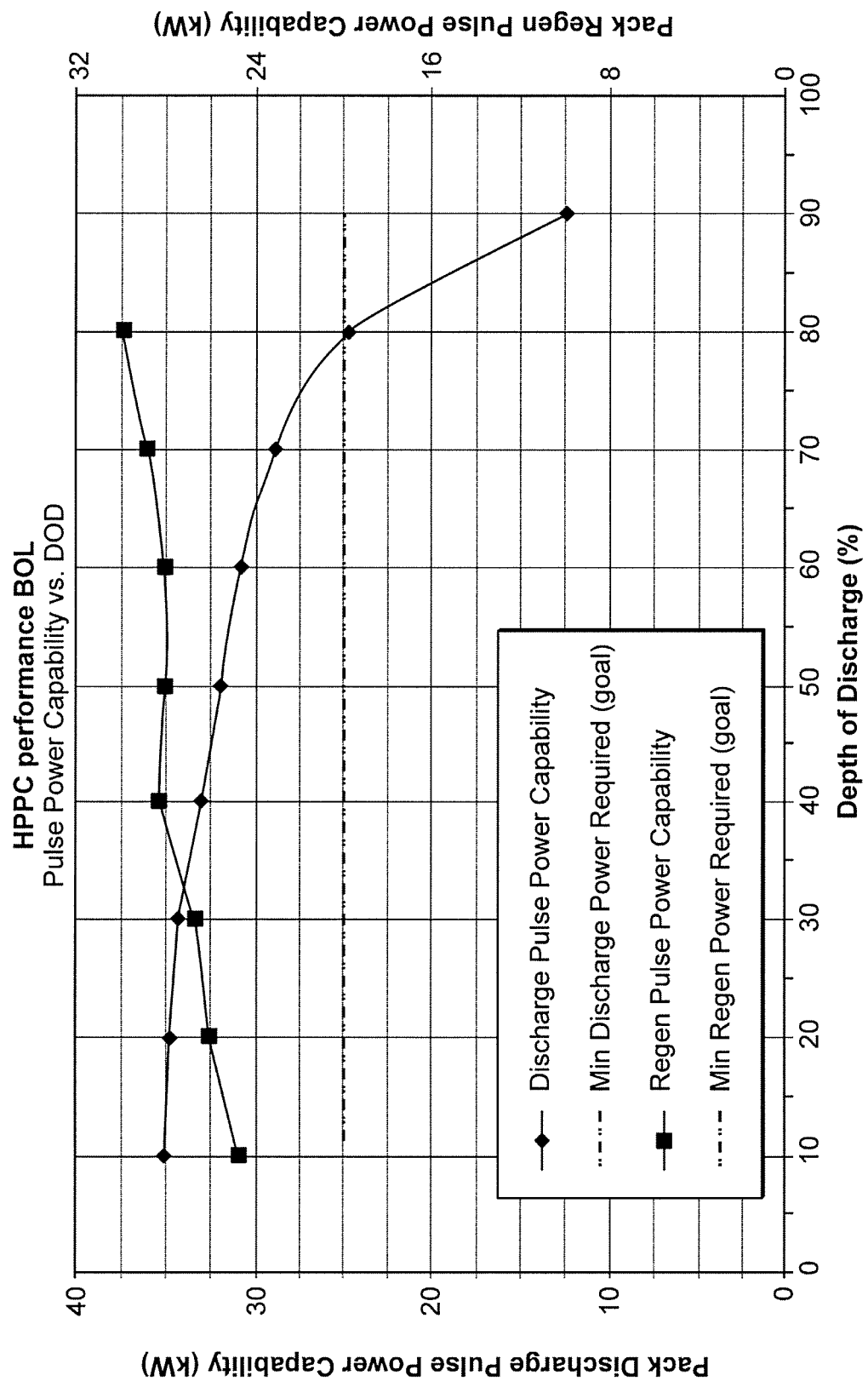
FIG. 9 is a plot showing the hybrid pulse power characterization (HPPC) performance at the beginning of life (BOL) for a lithium-ion battery according to certain embodiments.

The results of the HPPC test on the cell at the beginning of life (BOL) are shown in FIG. 9. Also shown are the minimum discharge power and minimum regenerative power requirement goals according to the U.S. Department of Energy, *FreedomCAR Battery Test Manual for Power-Assist Hybrid Electric Vehicles* (October, 2003). FIG. 9 shows that the cell meets or exceeds the minimum discharge and regenerative power requirement goals between 10% and 80% depth of discharge. Available energy of the cell can be determined from the distance on the x-axis (depth of discharge) between (1) the intersection of the curves representing minimum discharge power required and discharge pulse power capability, and (2) the intersection of the curves representing the minimum regenerative power required and the regenerative pulse power capability (assumed to go to zero at 10% depth of discharge). This distance can be converted to energy, as described in the U.S. Department of Energy, *FreedomCAR Battery Test Manual for Power-Assist Hybrid Electric Vehicles* (October, 2003). Manufacturers commonly specify BSF based on testing and estimates of allowances required for system burdens and degradation over life. BSF can be viewed as a way of balancing performance versus cost: in general, adding more cells to a battery pack increases cost, but makes it easier to meet other performance goals.

Figure 10A:
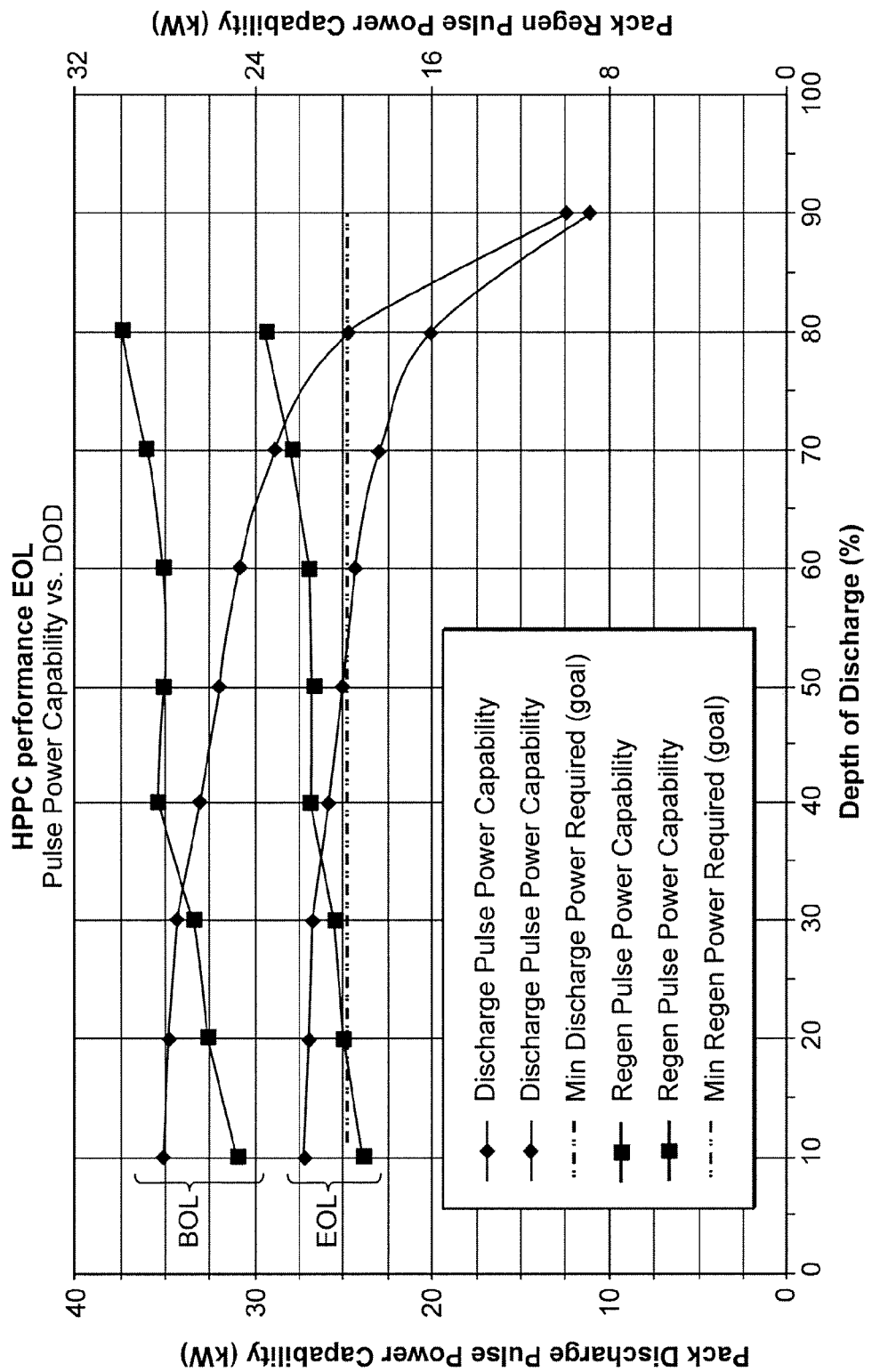
FIGS. 10A-B are plots showing the mathematically modeled hybrid pulse power characterization (HPPC) performance at the end of life (EOL) for a lithium-ion battery according to certain embodiments.
Figure 10B:
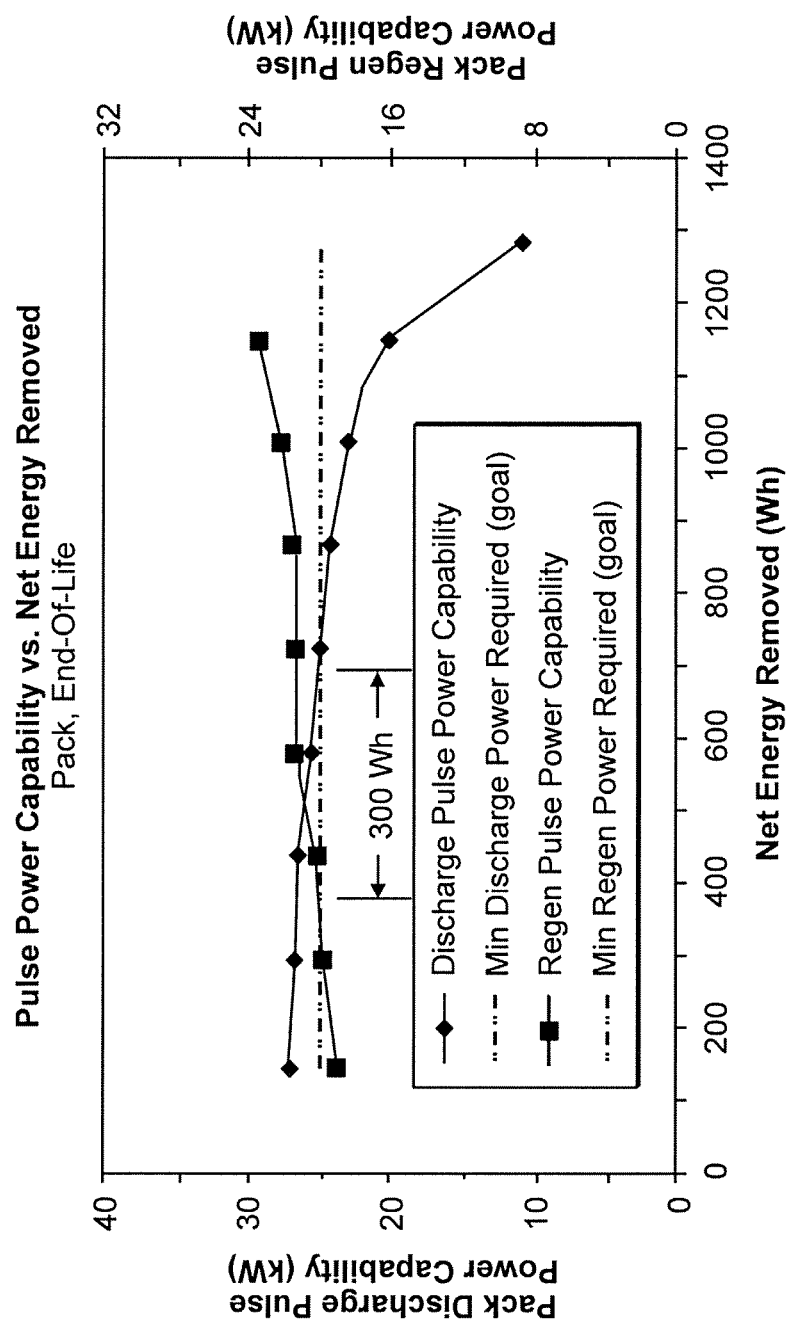

Based on the beginning of life performance curves shown in FIG. 9 and a BSF of 200, a mathematical model was used to estimate the impedance growth that would be required to bring the pack to the end of its life in a hybrid electric vehicle application (defined as 300 Wh available energy, while still delivering the discharge and regenerative pulses). The impedance growth required to reach end of life was determined to be about 4.5 mΩ (assuming an initial impedance on the order of 15 mΩ, this represents an impedance growth of ~30% to reach end of life). The mathematical model was based on the impedance change results described in Example 8, and assumed that only the cell impedance affects HPPC performance. Impedance growth acts to depress the HPPC curves, pushing them down. When the HPPC pulse power capability curve is below the goal for the discharge or regenerative pulse, the pack is unable to meet the goal at that SOC. The SOC range where the pack is able to meet both the discharge and regenerative pulses defines the available energy, as defined by the *FreedomCAR Battery Test Manual* (also see FIG. 10B). FIG. 10A is a plot showing the mathematically modeled hybrid pulse power characterization (HPPC) performance at the end of life (EOL) for the cell, in addition to the BOL curves shown in FIG. 9, as a function of depth of discharge. FIG. 10B shows the same end of life HPPC performance curves as shown in FIG. 10A, but as a function of net energy removed rather than depth of discharge. The curves in FIG. 10B suggest that, based on the mathematical model employed, even at the end of its life the cell will provide the required 300 Wh for hybrid electric vehicle applications.

The results for the cell tested in this Example were compared to published results for two comparative lithium-ion cells (see, Kim et al., "High Performance Lithium Ion Polymer Battery for Hybrid Electric Vehicle" and Lacout et al., "High Power Li-ion Technology for Full Hybrid Automotive Application: LION HEART Project," both presented at the EVS21 Conference, Monaco, Apr. 2-6, 2005). The comparative HPPC performance results are shown in FIG. 11, along with results for a cell as described herein (Test Cell). The two comparative lithium-ion batteries exhibit higher pulse power, presumably due to costly oversizing to allow the battery pack to meet performance requirements at the end of life. The two comparative lithium-ion batteries also exhibit more steeply sloped curves, indicating a more rapid decrease in available energy with impedance growth (pulse power capability curves shift downward on the y-axis as impedance grows). This more rapid decrease in available energy with impedance growth is undesirable, again creating a need to oversize the battery pack so that it can meet power requirements toward the end of its life. The flatter HPPC curves exhibited by the cell as described herein (Test Cell) also are desirable because they indicate an ability to meet hybrid electric vehicle performance goals over a wider range of state of charge (SOC), thus allowing more flexibility regarding how narrowly the SOC of the cell must be controlled.

Example 10

Cycle Life at Elevated Temperature

Figure 12:
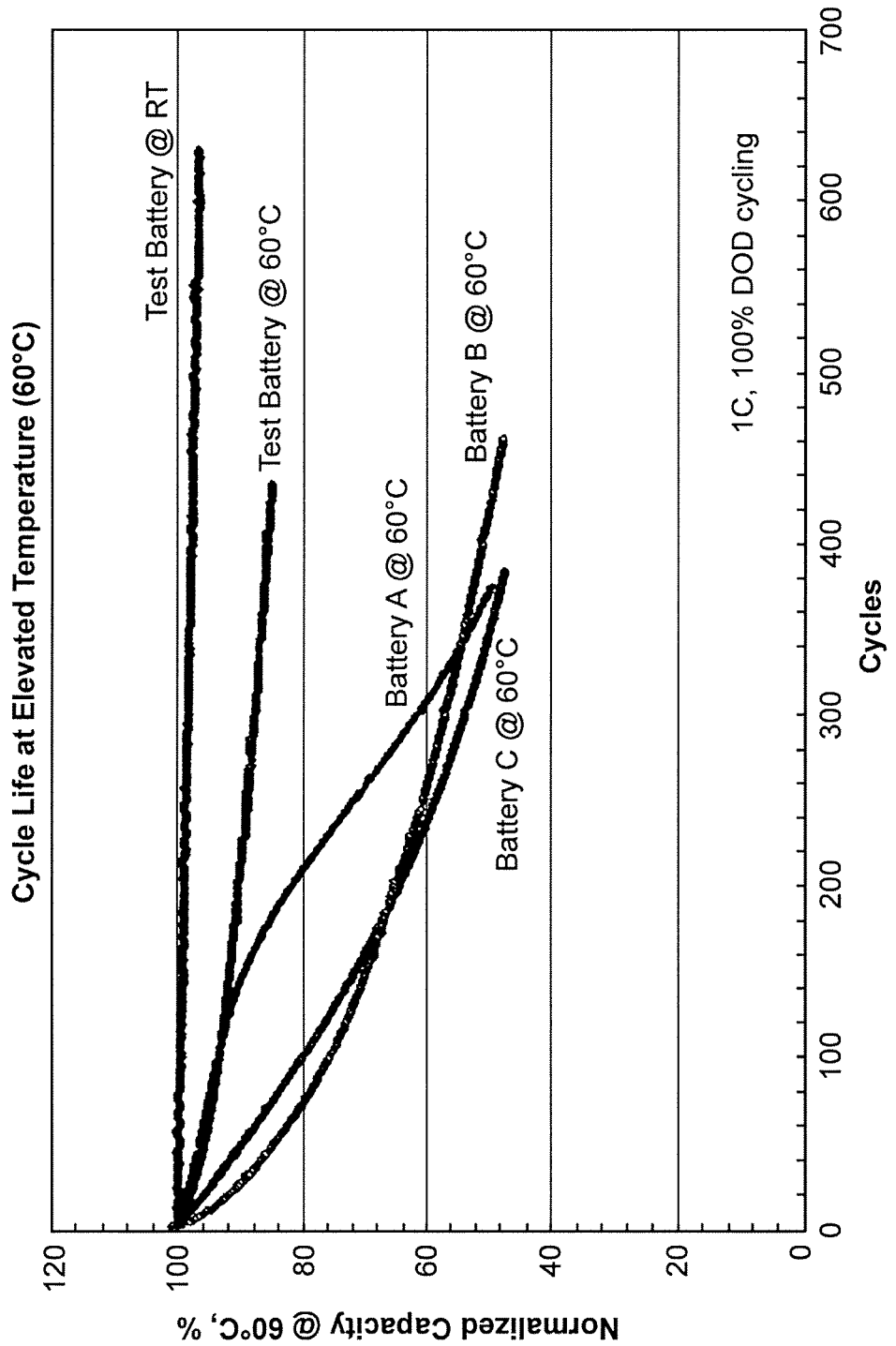
FIG. 12 is a plot showing the cycle life performance at high temperature for lithium ion batteries according to certain embodiments, and three comparative lithium-ion batteries.

Battery performance as a function of number of charge-discharge cycles was evaluated. Batteries manufactured according to one of the embodiments described in the above Examples were stored at room temperature (approximately 25° C.) and 60° C. The test batteries were form factor 26650 batteries (where '26' indicates a diameter of about 26 mm, and '65' indicates a height of 65 mm), with a lithium-doped iron phosphate cathode and graphite anode. For comparison, three high power lithium batteries, from different manufacturers, were also stored at 60° C. Battery A also had a 26650 form factor, with an $LiMn_{1/3}Co_{1/3}Ni_{1/3}O_2$ cathode and graphite anode. Battery B had a 18650 form factor with a $C-LiFePO_4$ cathode and graphite anode, while Battery C had a 26700 form factor (using the same rule for determining the battery dimensions) with an $LiMn_2O_4$ cathode and a graphite anode. All batteries were cycled at 1C (charge and discharge) to the maximum recommended voltage for each battery. For example, the test batteries according to one of the embodiments described herein has a maximum recommended voltage of 3.6V. The other cells were charged to the manufacturers' recommended limits of 4.2V. To ensure the cells were fully charged, once maximum voltage was reached, the batteries were held at constant voltage until the current decayed to C/10. For example, the test batteries according to one of the embodiments described herein were discharged to 2V. After discharge, the batteries were momentarily rested (approximately 1 minute) before charging again. FIG. 12 is a graph of the normalized capacity for each battery during the charge-discharge cycles (data for multiple cells were averaged at each cycle number). All values were compared to the initial capacity (capacity during the first charge-discharge cycle). Thus, normalized capacity is the capacity during each charge-discharge cycle divided by the initial capacity. As shown in FIG. 12, the capacity decrease for cells manufactured in accordance with one of the embodiments described herein was much lower compared to the comparison batteries. For example, the capacity decrease for the test battery held at 60° C. less than 20% (>80% of initial capacity), whereas the capacity decrease for each of the comparison batteries was greater than 40% (<60% of initial capacity).

Figure 13:
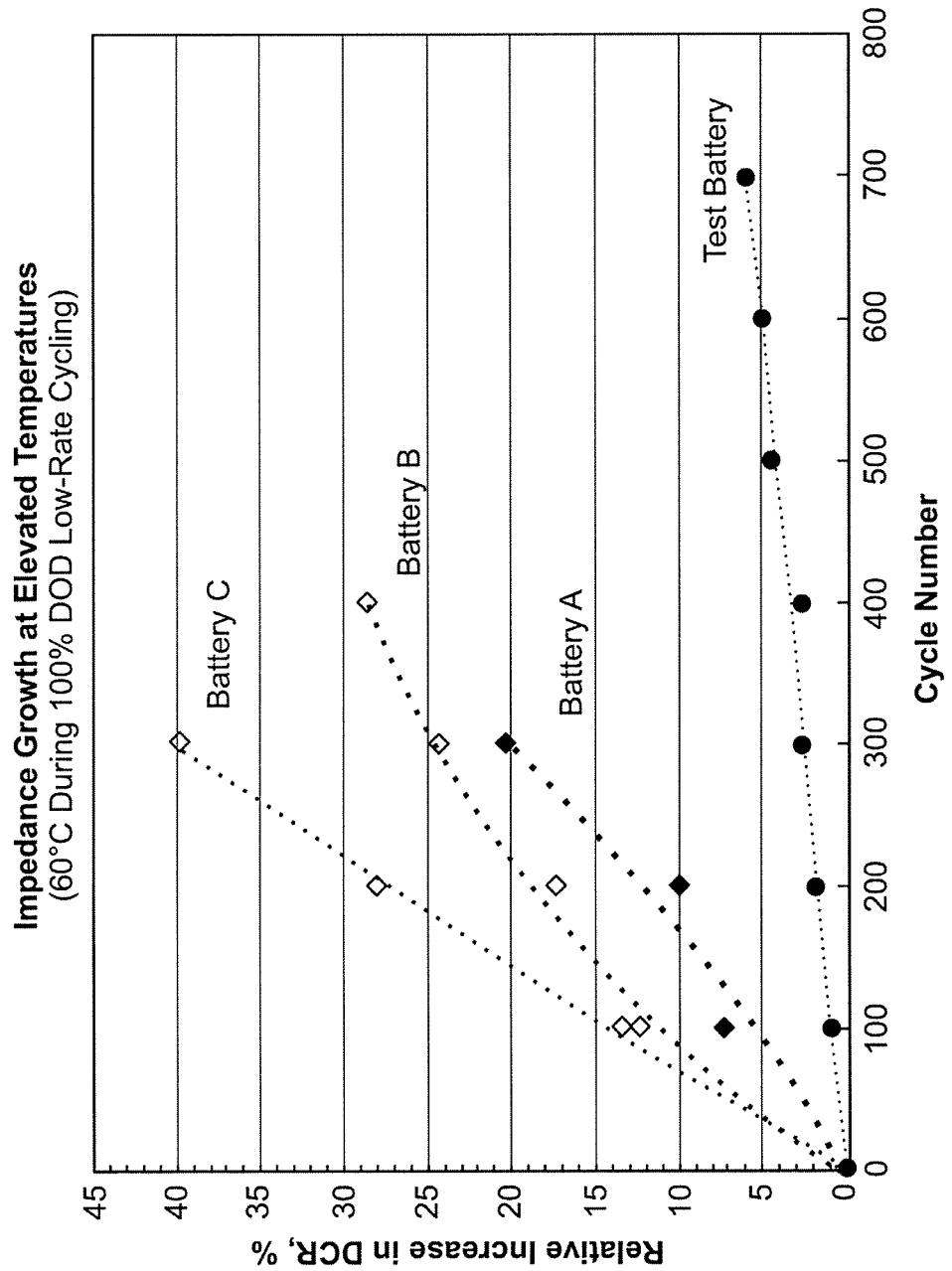
FIG. 13 is a plot showing impedance growth versus number of charge-discharge cycles for a lithium ion battery according to certain embodiments, and three comparative lithium-ion batteries, all stored at elevated temperature.

The impedance growth was also determined; the data are shown in FIG. 13, showing the relative increase in DC resistance as a function of the cycle number. Batteries were held at 60° C. and cycled as described above. Resistance was determined using a current interrupt method (1 second discharge) at 90% state of charge and was calculated from the voltage drop during the current pulse using the equation V=IR. As shown in FIG. 13, the resistance increase for the batteries manufactured according to one of the embodiments described herein was less than 10% after 700 charge-discharge cycles. These data compare favorably to the comparison batteries, which had increases in resistance ranging from about 20% to about 40% after only 300-400 charge-discharge cycles. These data confirm the stability of the batteries made in accordance with one of the embodiments described herein relative to high-power lithium batteries currently available.

Example 11

Cycle Life at High Rate Cycling and Elevated Temperature

Figure 14:
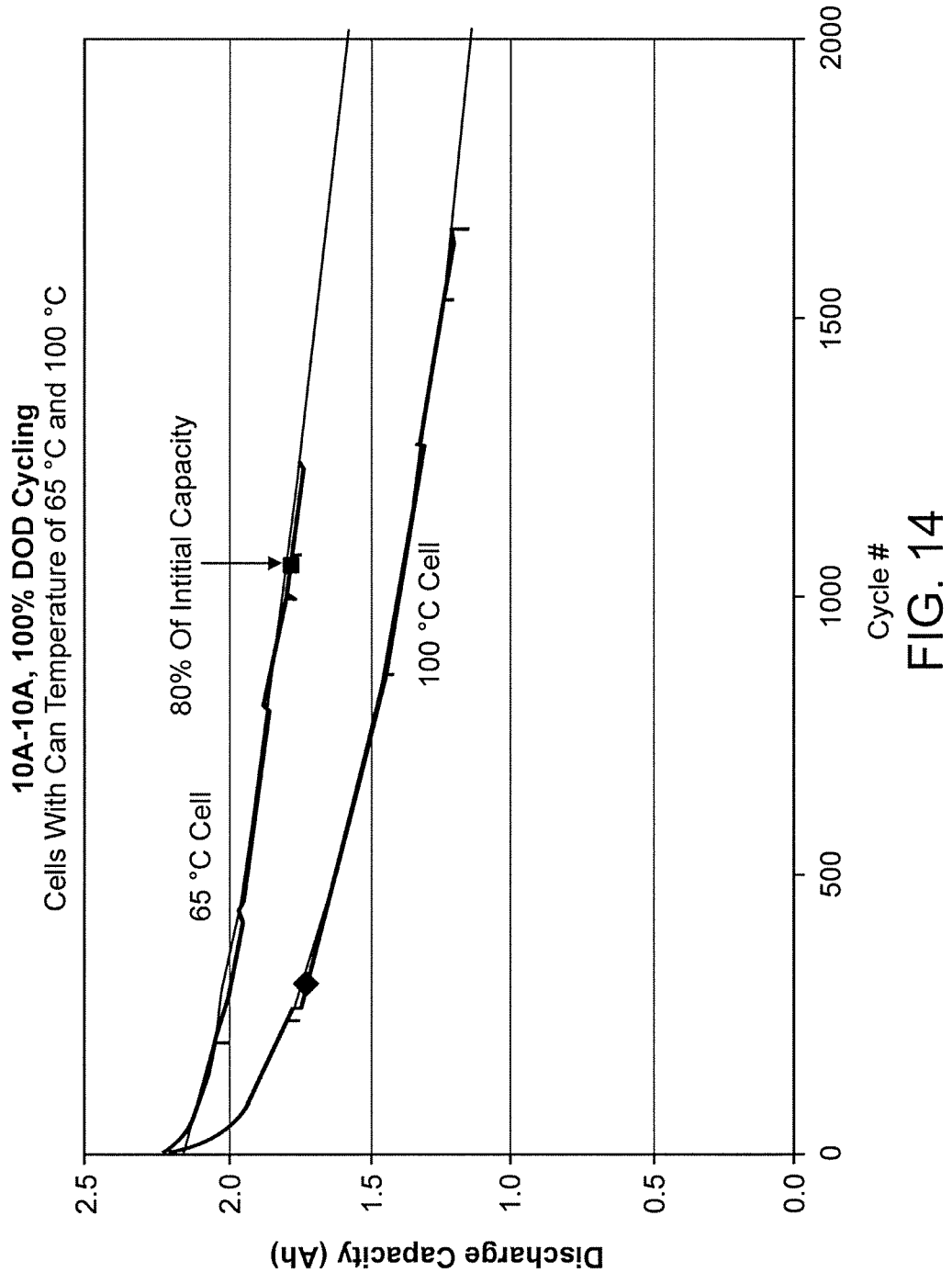
FIG. 14 is a plot showing the cycle life performance at high temperature and high rate cycling. The plot shows the change in discharge capacity (Ah) versus cycle number (charge-discharge cycles) for lithium ion batteries according to certain embodiments that were stored at different temperatures.
Figure 15:
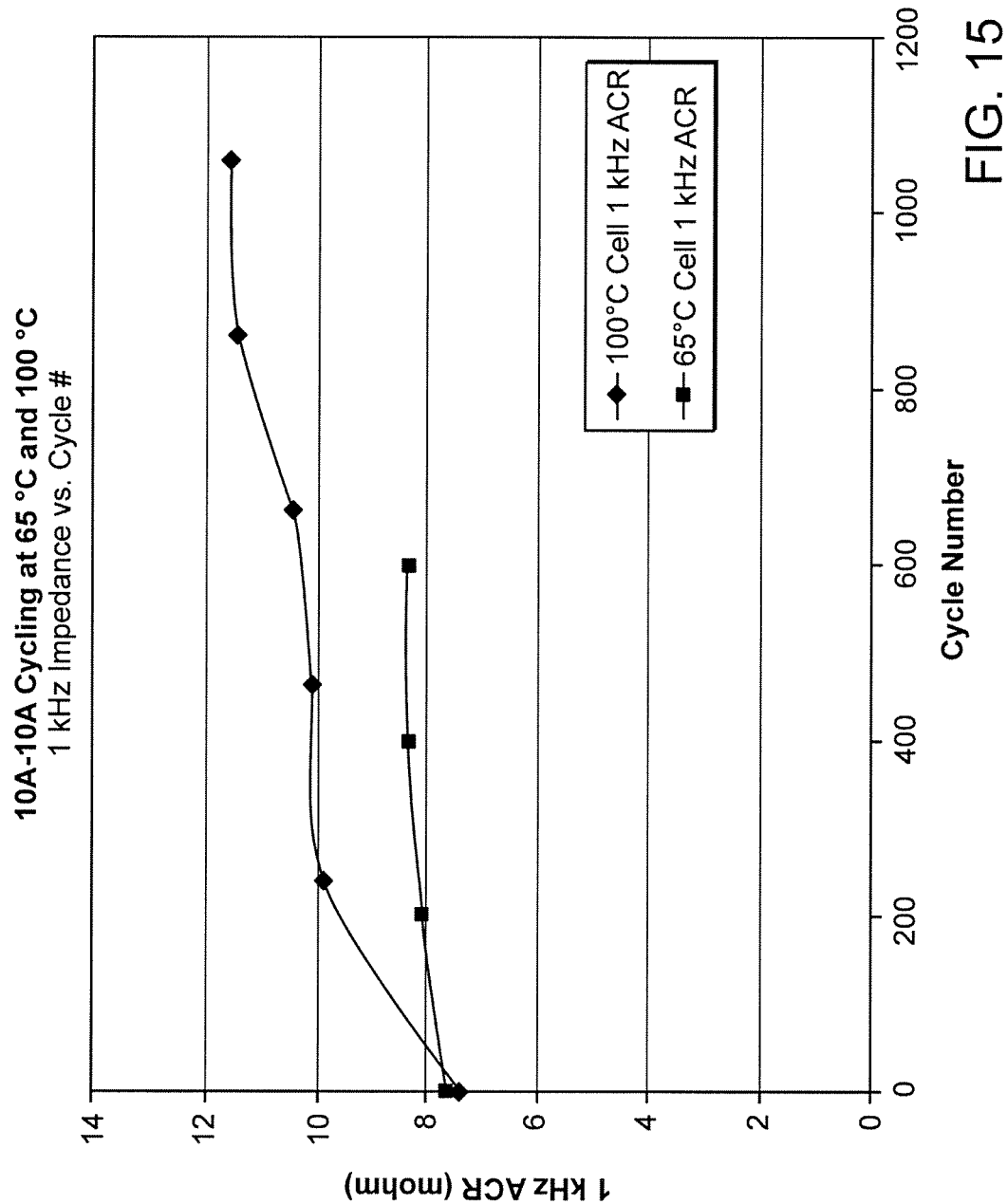
FIG. 15 is a plot showing the effect of cycle number on impedance for lithium ion batteries according to certain embodiments that were cycled at different temperatures and at high rate (10A charge/discharge, 100% degree of discharge)

Battery performance was also evaluated during high rate cycling at elevated temperatures. Batteries manufactured as described in the above Examples were subjected to 10A charge and discharge cycles (approximately 4C) at elevated temperature. The cell temperature during cycling was either 65° C. or 100° C. In this experiment, the cells were briefly rested (approximately 1 minute) at the end of each charge and discharge interval (i.e., no constant voltage hold as described in Example 10). FIG. 13 shows a graph of the discharge capacity versus cycle number. These data demonstrate that even under extremely abusive conditions of high rate and high temperature, the cells exhibit a relatively shallow and smooth rate of decay with no sharp changes. Thus, the decay is considered well-behaved. For example, the arrow on FIG. 13 corresponds with a discharge capacity that is approximately 80% of initial capacity. These data demonstrate that even after about 1,000 high rate charge-discharge cycles at high temperature (65° C.), the battery has lost only about 20% of its initial capacity. Similarly, FIG. 14, which depicts the change in AC resistance at 1 kHz, demonstrates a low rate of impedance growth even under these harsh experimental conditions. Resistance, or more specifically the real component of the impedance, was determined using electrochemical impedance spectroscopy, which is well known to those of skill in the art. A 5 mV sinusoidal perturbation (AC excitation) was employed using a Solartron 1260/1281 Frequency Response Analyzer and Zplot software (2 kHz to 0.5 Hz frequency range (for comparison purposes, the real value of impedance at 1 KHz, Z', is used as a measure of cell resistance). For the cell stored at 65° C., there is only a marginal increase in resistance after 600 charge-discharge cycles. Even at 100° C. the data demonstrate a remarkably low amount of increased impedance, given the harsh test conditions.

Example 12

Long-Term Storage

Figure 16A:
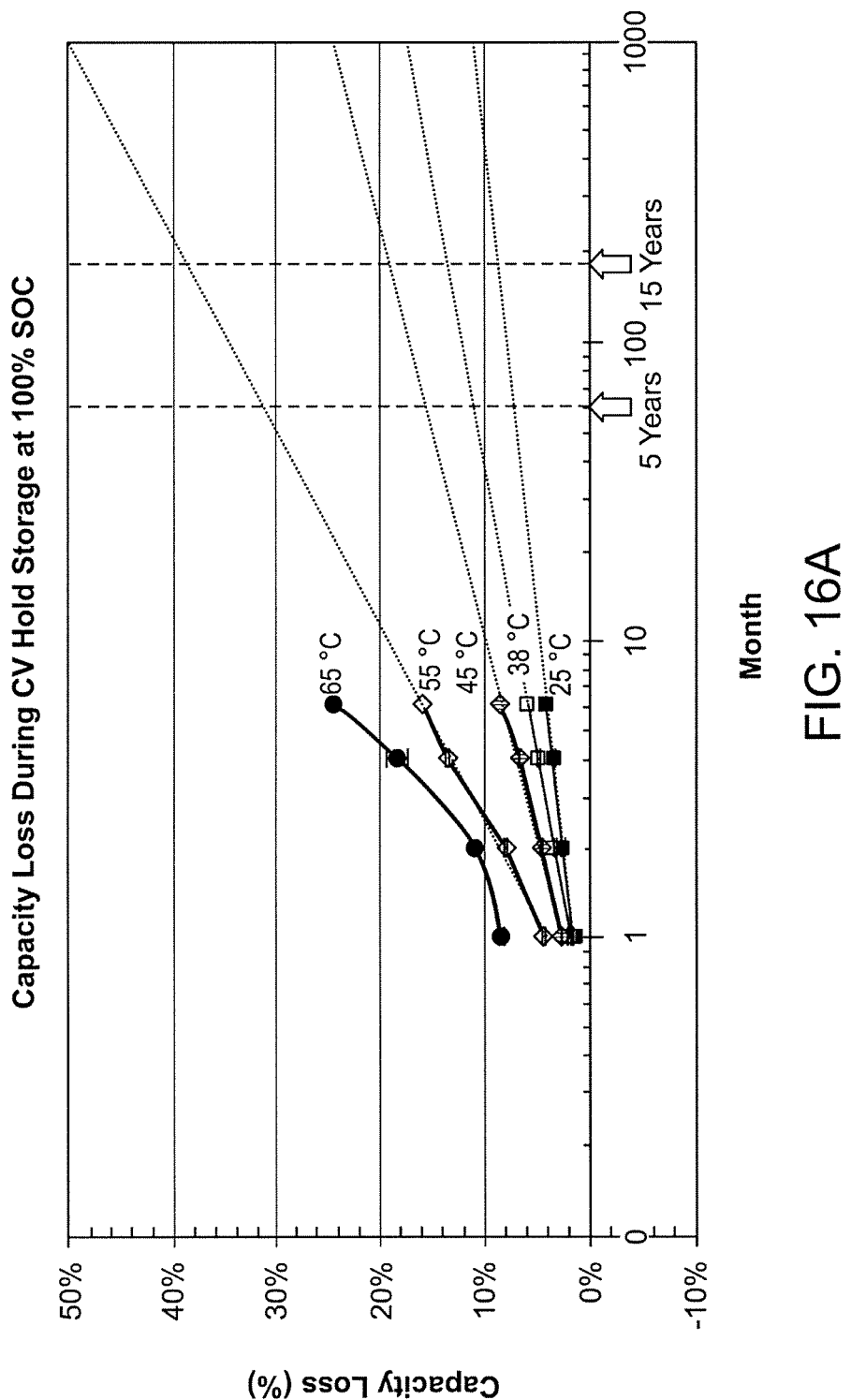
FIGS. 16A-B are plots showing the effect of long term storage on batteries according to certain embodiments that were stored at different temperatures under constant voltage hold and 100% state of charge.
Figure 16B:
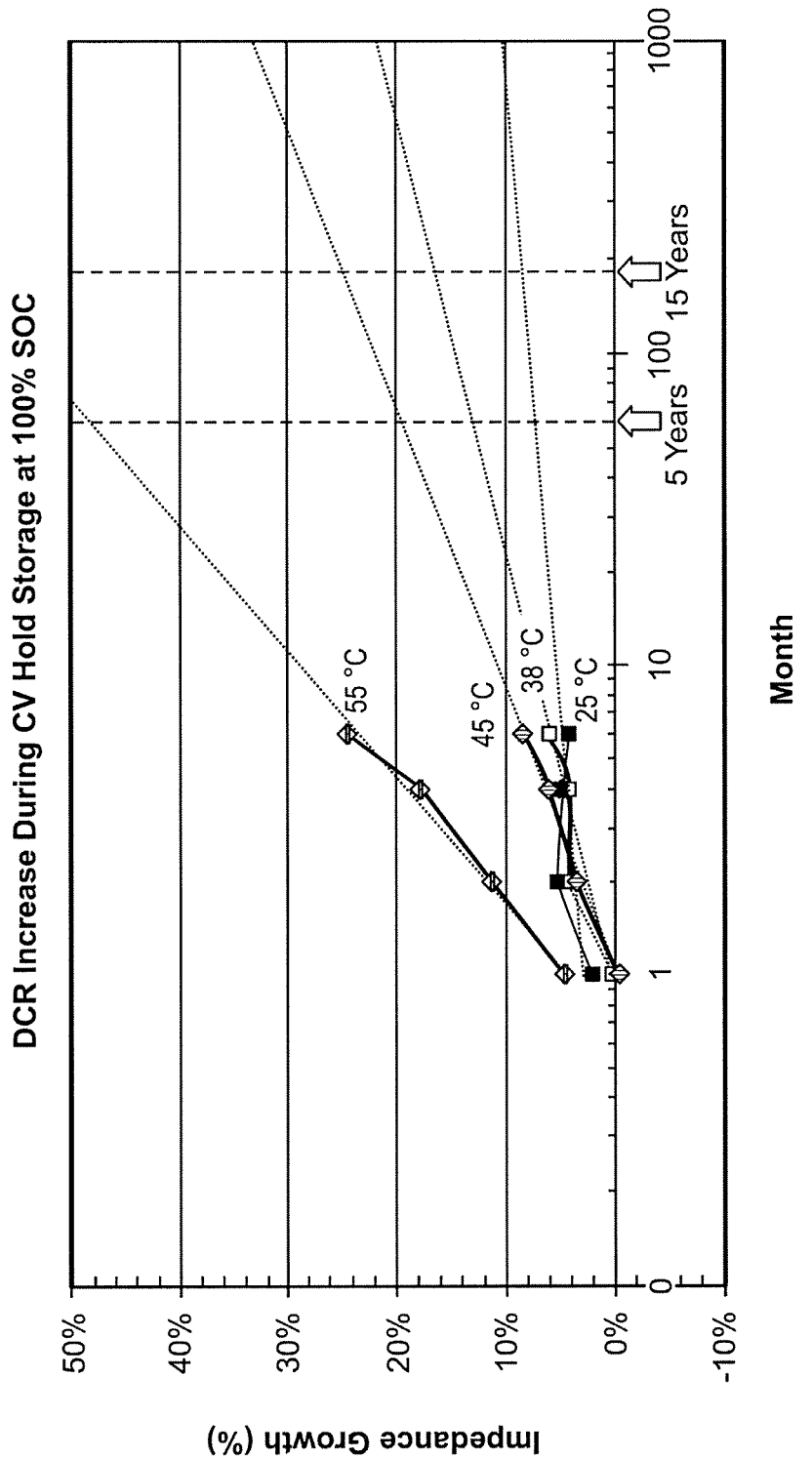

Batteries manufactured as described in the above Examples were stored at 25° C., 38° C., 45° C., 55° C., and 65° C.; cell capacity and impedance growth were determined at periodic intervals. FIGS. 16a and 16b correspond to cells stored at constant voltage hold, as described above for Example 10 at 100% state of charge. The data are plotted on a semi-log plot: capacity loss (FIG. 16a) or impedance growth (FIG. 16b) versus time. The solid lines in each graph represent experimentally determined values, while the dashed lines represent estimation based on a linear regression fit of the data. As shown in FIG. 16a, cells stored for six months at temperatures up to 45° C. exhibited a loss of capacity of less than 10%. Likewise, the impedance growth for these cells was also less than 10% over the six month time period. The projected capacity loss is approximately 15% after 5 years and approximately 20% for 15 years for cells stored at a temperature up to about 45° C. These data provide further evidence that cells manufactured as described herein exhibit excellent stability characteristics and do not require the degree of oversizing required of lithium cells known in the art.

Figure 17A:
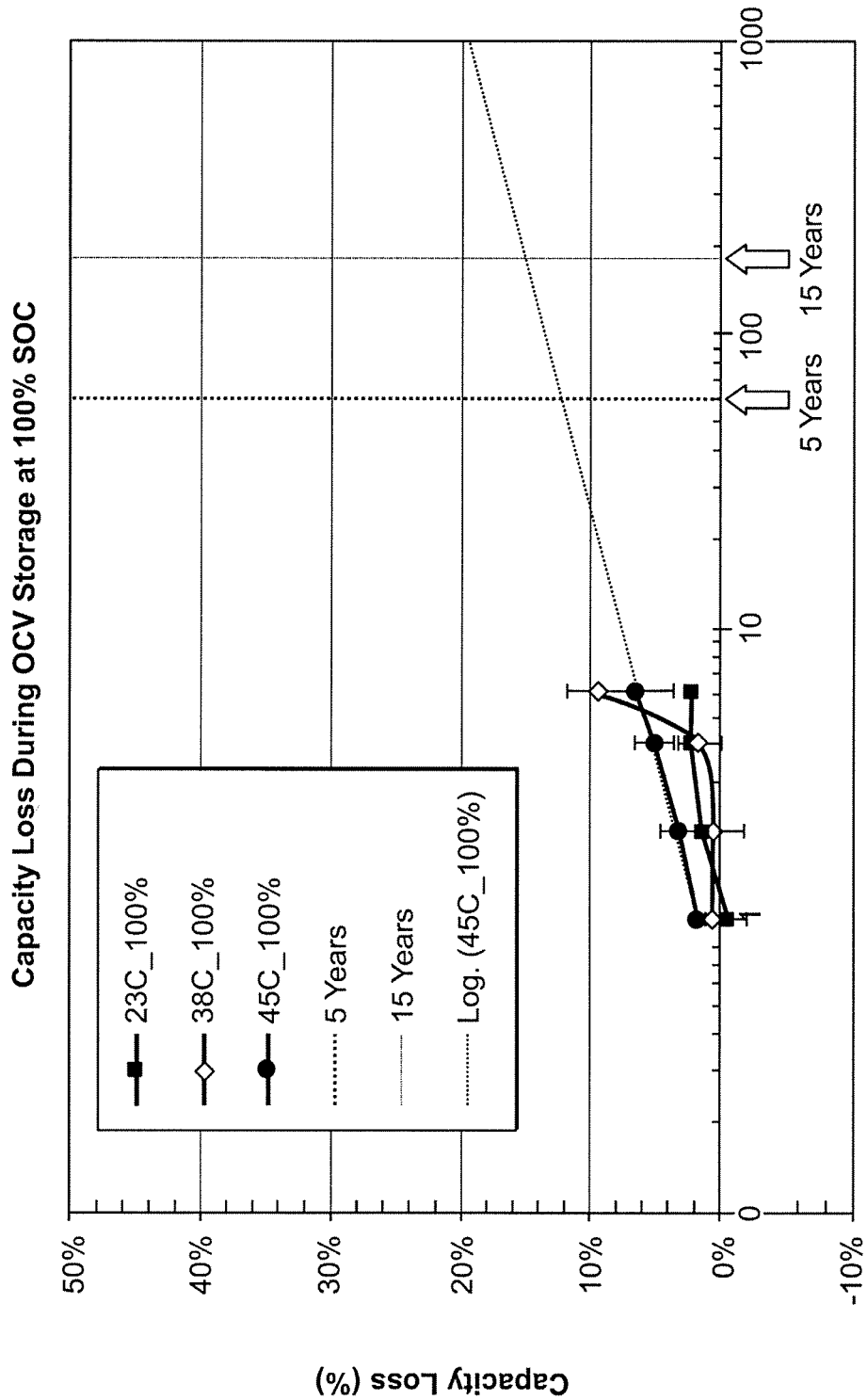
FIGS. 17A-B are also plots showing the effect of long term storage on batteries according to certain embodiments. The batteries shown in FIGS. 17A-B were stored at different temperatures under open current voltage hold and 100% state of charge.
Figure 17B:
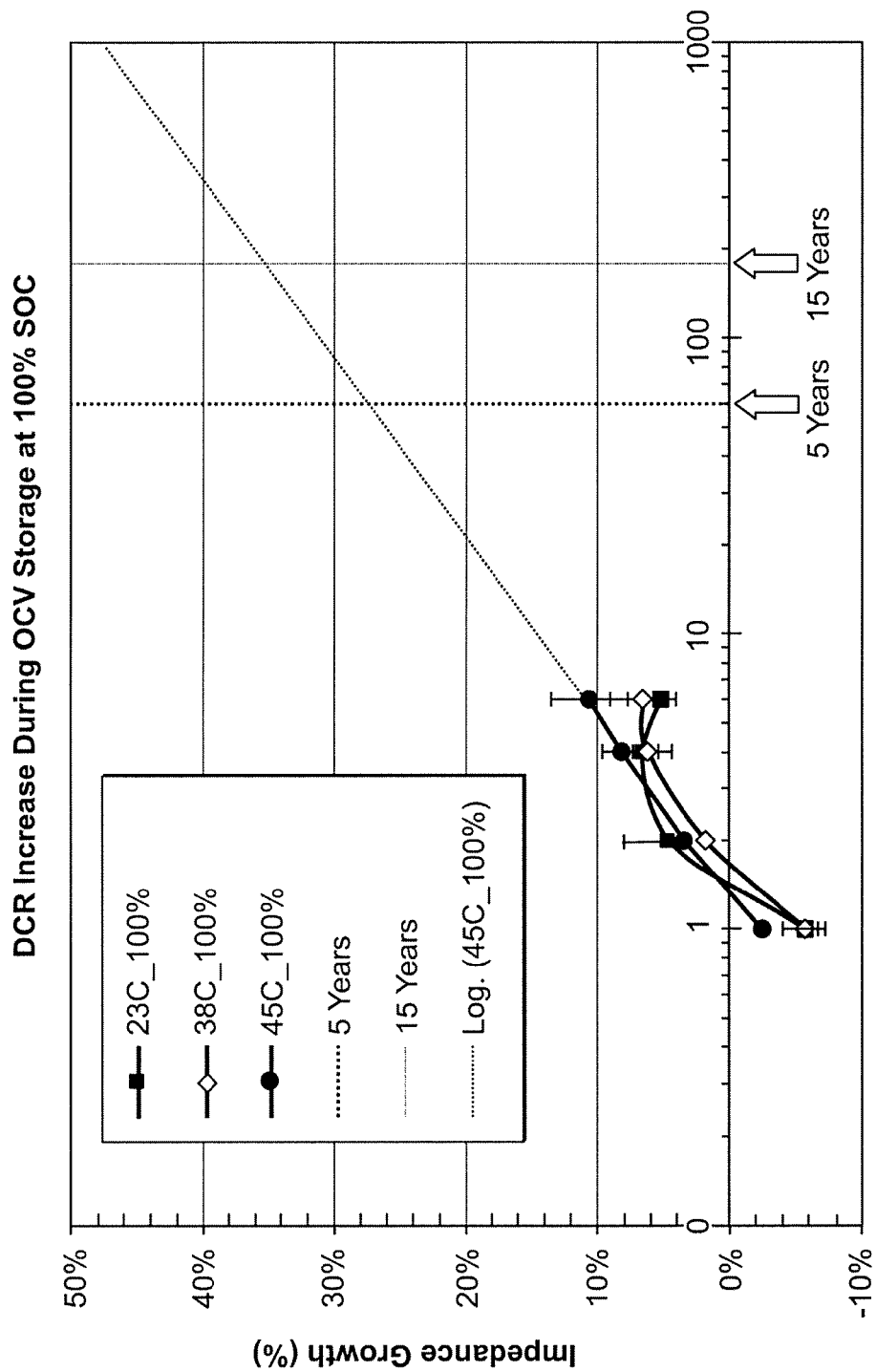

FIGS. 17a and 17b correspond to cells stored at 23° C., 38° C., and 45° C. at open current voltage and 100% state of charge. As with FIGS. 16a and 16b, these data confirm a low rate of capacity loss and impedance growth (<10% after 6 months for both factors). Moreover, as shown by the dashed line representing, the data project low capacity loss and relatively low impedance growth after 5 and 15 years.

Figure 18A:
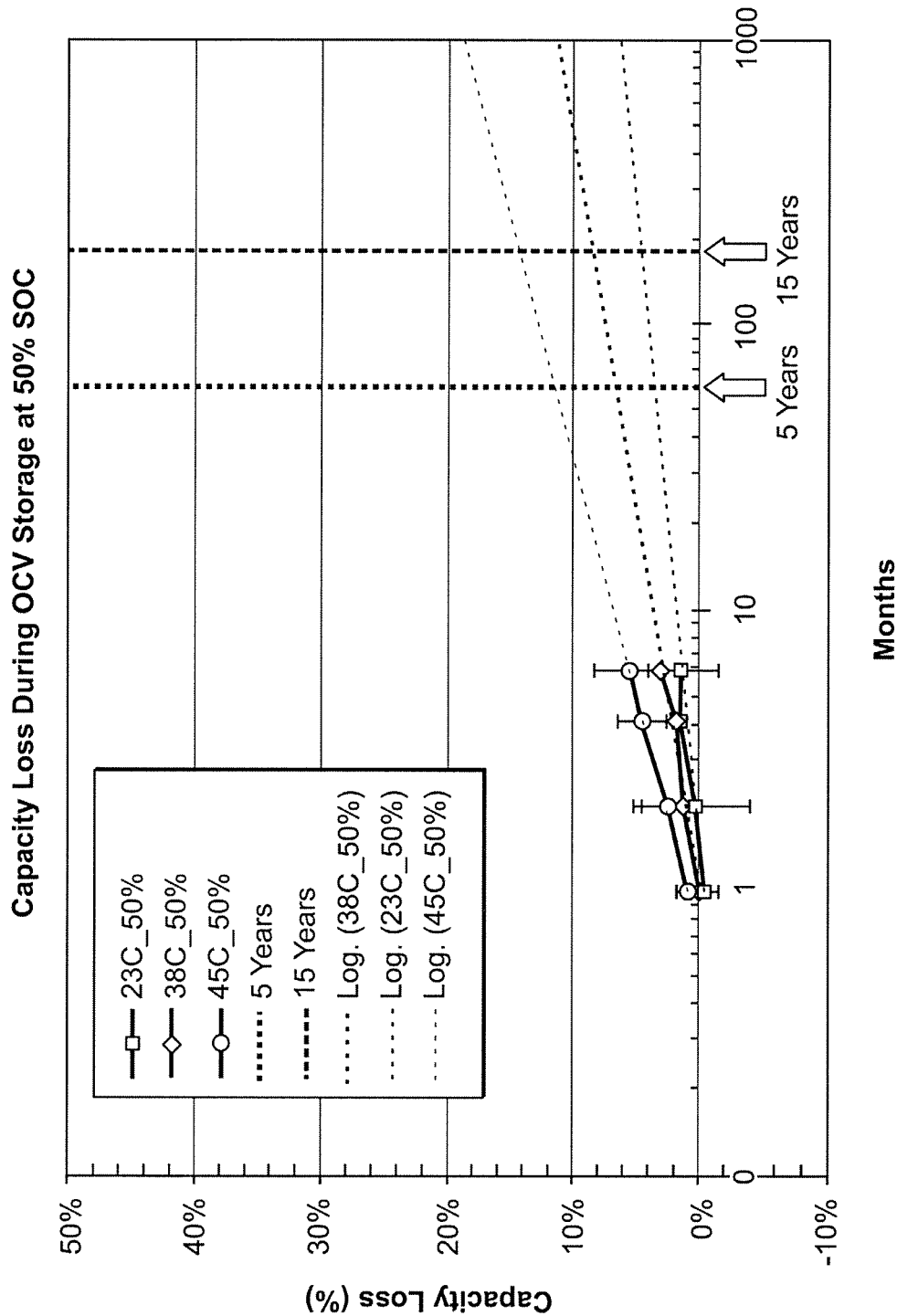
FIGS. 18A-B are also plots showing the effect of long term storage on batteries according to certain embodiments. The batteries shown in FIGS. 17A-B were stored at different temperatures under open current voltage hold and 50% state of charge.
Figure 18B:
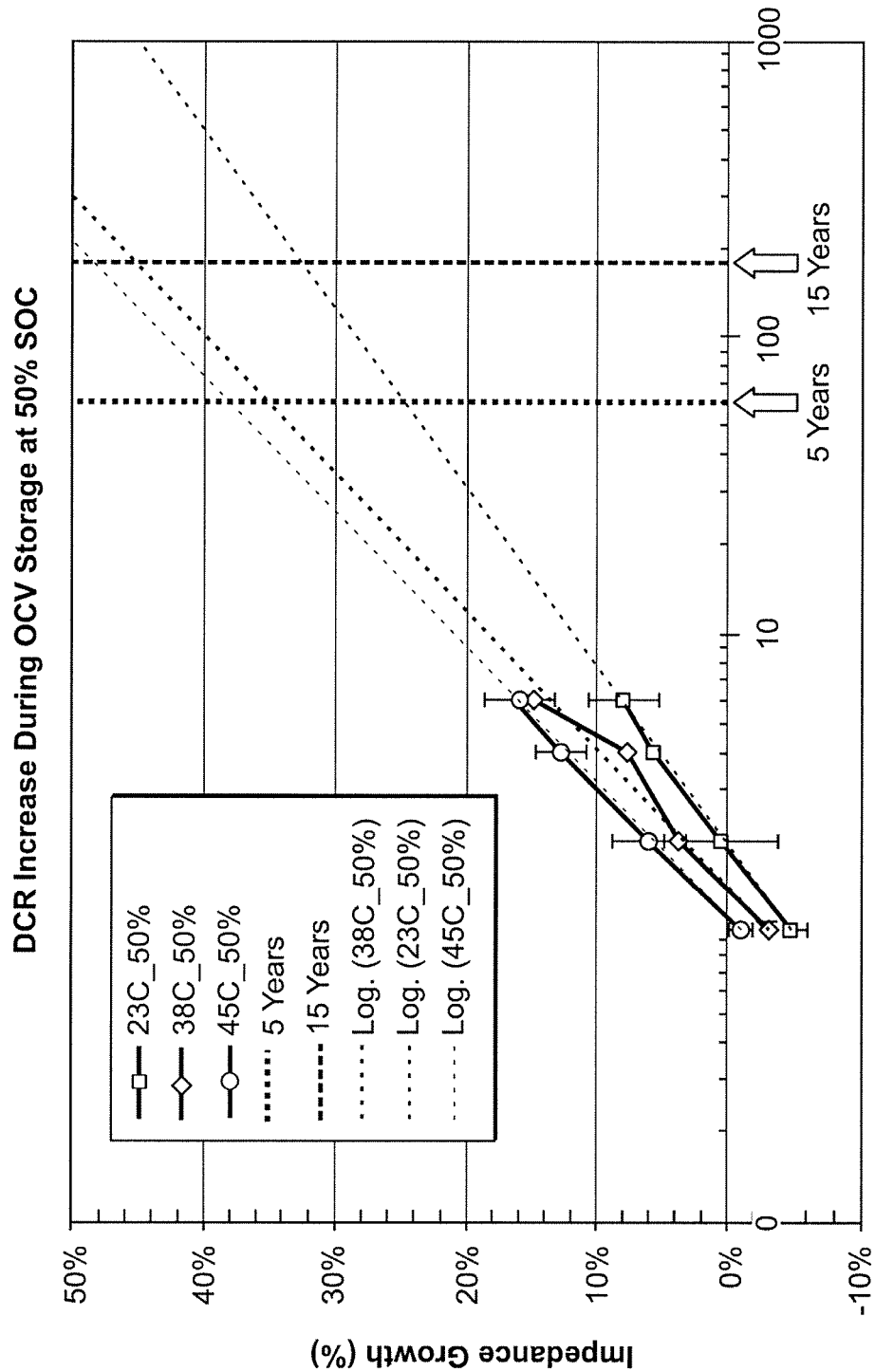

FIGS. 18a and 18b correspond to cells stored at 23° C., 38° C., and 45° C. at open current voltage and 50% state of charge. As with the data described above, these data also confirm a relatively low rate of capacity loss and impedance growth over 6 months (<20%), as well as a low projected decay over 5 and 15 years.

Moreover, the data in FIGS. 16a through 18b demonstrate that the cells exhibit a logarithmic rate of decay, as shown by the agreement with the data and the linear regression analysis. This type of decay is thought to be unique for lithium batteries, as it suggests a period of faster decay in the early period of storage, followed by a slower rate of decay with increasing storage time. Lithium batteries are generally known to exhibit a rate of decay that is linear with the square root of time. When data from batteries exhibiting such a rate of decay are plotted against log[time], the resulting graph shows a noticeable increase in the rate of decay as storage time increases. Thus, unlike batteries that exhibit a logarithmic rate of decay, the slope of the curve of log[time] versus capacity loss or impedance growth will increase with increasing time.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that the invention may be practiced otherwise than as specifically described. Accordingly, those skilled in the art would recognize that the use of an electrochemical device in the examples should not be limited as such. The present invention is directed to each individual feature, system, or method described herein. In addition, any combination of two or more such features, systems or methods, if such features, systems or methods are not mutually inconsistent, is included within the scope of the present invention.

We claim:

1. A method of operating-a lithium secondary cell, comprising:
   providing a lithium secondary battery, the lithium secondary cell comprising:
   a positive electrode including a lithium transition metal phosphate compound;
   a negative electrode including a carbon-containing lithium intercalation compound;
   a separator saturated with electrolyte in contact with and separating the positive electrode and negative electrode, wherein the components of the cell are selected to provide an area specific impedance of the positive electrode at least 3 times of the area specific impedance of the negative electrode and a total area specific impedance of the cell less than 20 $\Omega\text{-cm}^2$; and
   cycling a lithium secondary cell at a voltage of less than 4.2 V vs. Li through a plurality of charge-discharge cycles wherein the depth of discharge in the charge-discharge cycles is at least 50%, wherein the cell is charged at a rate of greater than 1C and wherein the cell exhibits a capacity loss of less than 0.2% per cycle.

2. The method of claim 1, wherein the cell has an available power at the beginning of life that is no more than 25% greater than a predefined power at end of life.

3. The method of claim 1, wherein the cell has an available power at the beginning of life that is no more than 20% greater than a predefined power at end of life.

4. The method of claim 1, wherein the cell has an available power at the beginning of life that is no more than 15% greater than a predefined power at end of life.

5. The method of claim 1, wherein the cell has an available power at the beginning of life that is no more than 10% greater than a predefined power at end of life.

6. The method of claim 1, wherein end of life is the point at which the cell has an available energy of 300 Wh.

7. The method of claim 1, wherein the depth of discharge in the charge-discharge cycles is at least 60%.

8. The method of claim 1, wherein the depth of discharge in the charge-discharge cycles is at least 70%.

9. The method of claim 1, wherein the depth of discharge in the charge-discharge cycles is at least 80%.

10. The method of claim 1, wherein the depth of discharge in the charge-discharge cycles is at least 90%.

11. The method of claim 1, wherein the operating voltage is 3.8 V.

12. The method of claim 1, wherein the operating voltage is 3.6 V.

13. The method of claim 1, wherein the operating voltage is 3.4 V.

14. The method of claim 1, wherein the impedance growth of the cell is logarithmic with respect to time at temperatures of up to about 55° C.

15. The method of claim 1, wherein the cell is charged at a rate greater than 2C.

16. The method of claim 1, wherein the cell is charged at a rate greater than 4C.

17. The method of claim 1, wherein the cell exhibits a capacity loss of less than 0.05% per cycle.

* * * * *